United States Patent [19]

Kobayashi et al.

[11] Patent Number: 4,870,427

[45] Date of Patent: Sep. 26, 1989

[54] METHOD OF PREPARING DRY TRANSFER SHEETS BY PRINTING VIA INK RIBBON

[75] Inventors: Tetuo Kobayashi; Mitsuo Yamane, both of Yokkaichi, Japan

[73] Assignee: Brother Kogyo Kabushiki Kaisha, Aichi, Japan

[21] Appl. No.: 122,337

[22] Filed: Nov. 18, 1987

[30] Foreign Application Priority Data

| | | | |
|---|---|---|---|
| Nov. 19, 1986 | [JP] | Japan | 61-275536 |
| Nov. 19, 1986 | [JP] | Japan | 61-275537 |
| Nov. 19, 1986 | [JP] | Japan | 61-275538 |
| Nov. 19, 1986 | [JP] | Japan | 61-275539 |
| Nov. 20, 1986 | [JP] | Japan | 61-277178 |
| Oct. 9, 1987 | [JP] | Japan | 62-255761 |
| Oct. 9, 1987 | [JP] | Japan | 62-255762 |
| Oct. 16, 1987 | [JP] | Japan | 62-262497 |
| Oct. 17, 1987 | [JP] | Japan | 62-262348 |

[51] Int. Cl.$^4$ .......... G01D 9/00

[52] U.S. Cl. .......... 346/1.1; 346/76 P H; 427/147

[58] Field of Search .......... 346/76 PH, 1.1; 427/147

[56] References Cited

U.S. PATENT DOCUMENTS 4,686,549 8/1987 Williams et al. .......... 346/1.1

FOREIGN PATENT DOCUMENTS 954459 4/1964 United Kingdom .
959670 6/1964 United Kingdom .
1079661 8/1967 United Kingdom .
1291960 10/1972 United Kingdom .
1364627 8/1974 United Kingdom .
1441982 7/1976 United Kingdom .

*Primary Examiner*—E. A. Goldberg
*Assistant Examiner*—Huan Tran
*Attorney, Agent, or Firm*—Oliff & Berridge

[57] ABSTRACT

A method of preparing a dry transfer sheet for transferring indicia such as characters and designs to a receiving surface of a receiving member. The transfer sheet is prepared by thermal printing of the desired indicia on a thermal printer, by using a heat-sensitive ink ribbon which has an ink layer consisting of a thermally fusible ink composition. The printer has a print head for heating selected portions of the ink layer. The ink ribbon and the carrier sheet are set on the printer, such that the ink ribbon is interposed between the print head and the carrier sheet. Printing data representative of the desired indicia are entered into the printer, and the print head is activated according to the entered printing data, in order to heat local portions of the ink layer which correspond to the desired indicia, and thereby transfer the ink composition from the heated local portions to an image-receiving surface of the carrier sheet, whereby the desired indicia are printed on the image-receiving surface with the transferred ink composition.

35 Claims, 8 Drawing Sheets

FIG.1
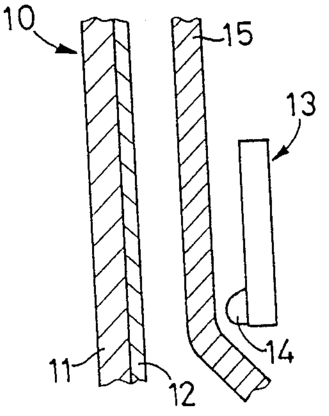
FIG.2
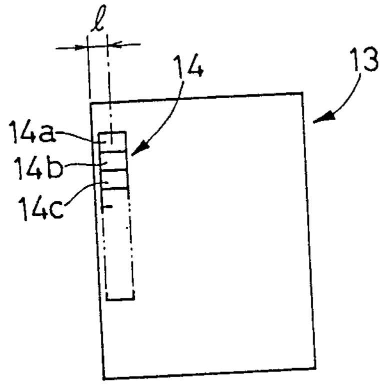
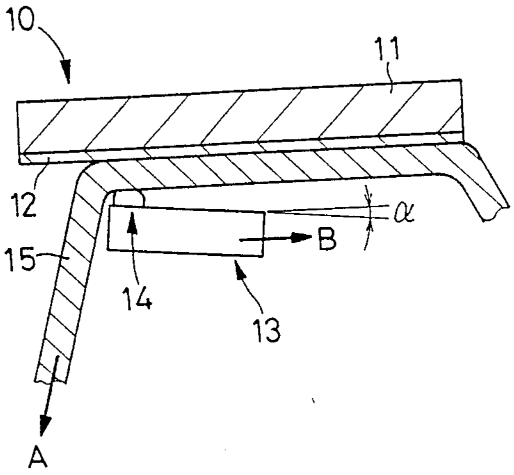
FIG.3
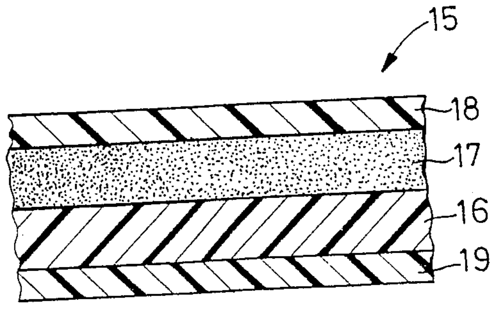
FIG.4

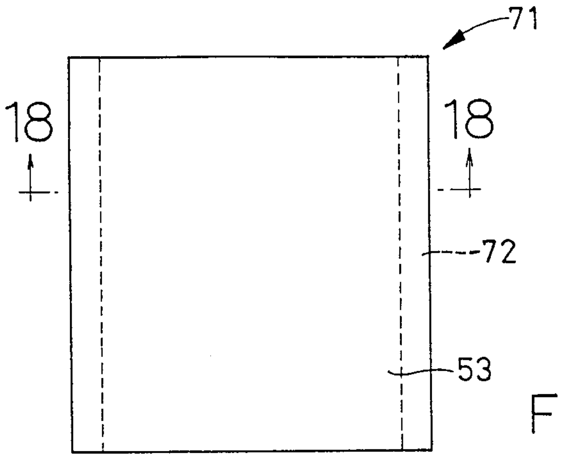
FIG.17
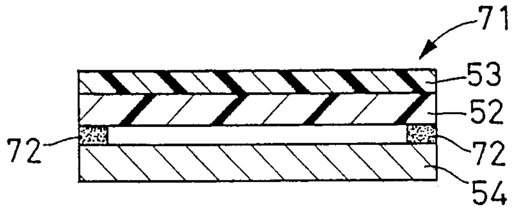
FIG.18
FIG.19
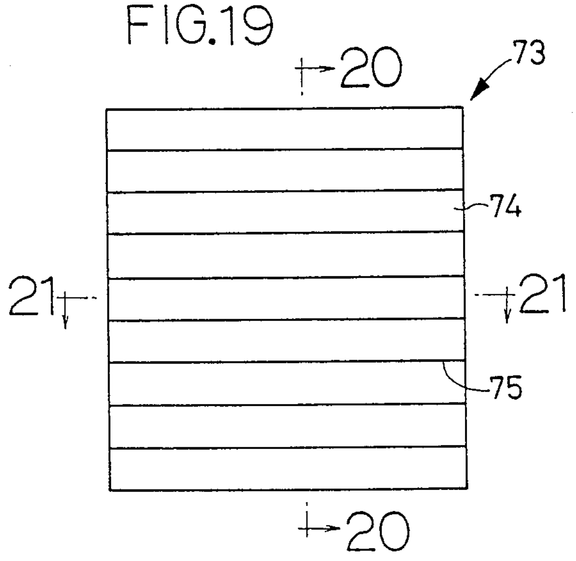
FIG.20
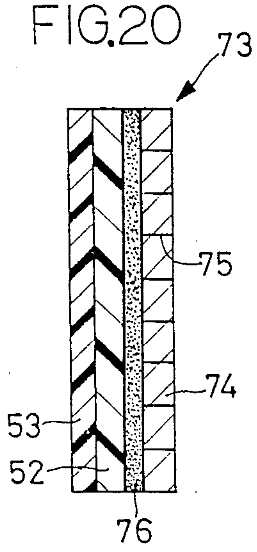

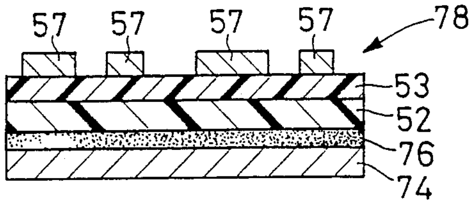
FIG.21
FIG.22
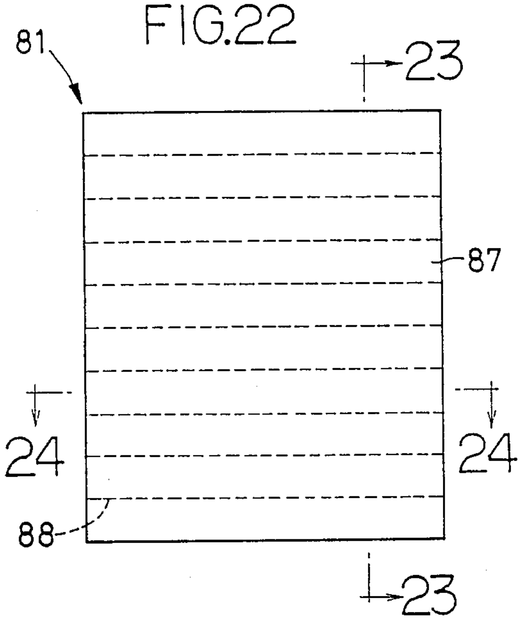
FIG.23
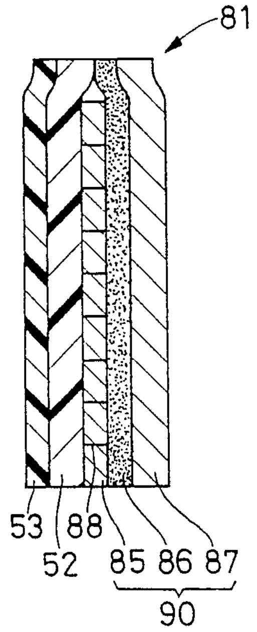
FIG.24
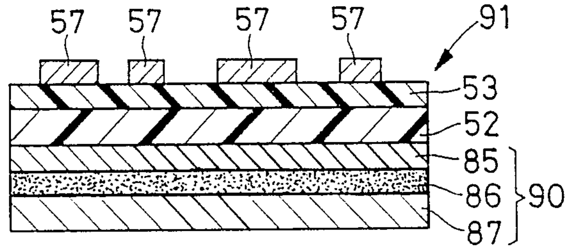

METHOD OF PREPARING DRY TRANSFER SHEETS BY PRINTING VIA INK RIBBON

BACKGROUND OF THE INVENTION

1. Field of the Invention

The present invention relates in general to a method of preparing dry transfer sheets or decalcomanias, and more particularly to a simple method suitable for preparing dry transfer sheets for transferring to desired receiving surfaces desired graphic images or indicia such as letters and designs which are printed on carrier sheets.

2. Discussion of the Prior Art

It is known to produce graphic images or indicia such as lettering or graphic designs by transferring the graphic images from a dry transfer sheet or material to a desired receiving surface. A known method for preparing such dry transfer sheets consists in transferring desired graphic images to a suitable carrier sheet, for example by screen-printing with an ink material. Usually, an adhesive coat is applied to cover the transferred indicia on the carrier sheet, by a printing, spraying, wire-bar technique. Thus, the dry transfer sheet is prepared. With an action of the adhesive coat, the selected indicia can be transferred from the dry transfer sheet and adhered to the desired receiving surface. Such types of dry transfer sheets or materials, or adhesive transfers have been proposed, for example, in British Patent Specifications Nos. 954459, and 959670.

The method of producing the dry transfer sheets of the type indicated above requires the use of a screen-printing machine, and the preparation of printing plates carrying desired indicia, silk screens, or similar printing equipment and tools. The practice of such a printing method needs a large amount of investment in the equipment, and a considerably long time.

Therefore, the users who can not afford such substantial amounts of expense and time must buy commercially available dry transfer sheets which carry printed graphic images or indicia. In this instance, the users are sometimes or frequently forced to buy the dry transfer sheets which include letterings and/or graphic designs other than those which are not desired or needed by the users. Since the undesired indicia remain unused, the cost of transfer per character, for example, is relatively high. If the users require special images of their own choice, they often cannot find their desired images on the commercially available dry transfer sheets. If the images to be transferred consist of a word, phrase or sentence, for instance, the users are required to individually transfer the corresponding letters from a transfer sheet or sheets, one after another, while registering the transferred letters. This procedure is very cumbersome and time-consuming, particularly when a complicated layout or neat arrangement of the letters is desired.

In recent years, photbgraphic methods of producing dry transfer sheets or materials have been proposed, in place of the printing method described above. For example, the methods are, disclosed in British Specifications Nos. 1079661, 1291960, 1364627 and 1441982. In such a proposed photographic method, a light-sensitive sheet is image-wise photographically exposed in conjunction with an original constituting a master of desired indicia such as letters and designs. The exposed light-sensitive sheet is then separated from the original and subjected to a developing process, whereby a dry transfer sheet consisting of the developed sheet as an image-carrier sheet is produced.

However, the photographic method including exposing and developing steps requires exposing and developing devices, and consequently needs considerable amounts of investment and time, though the amounts are less than those required for the screen-printing method stated above. In this case, too, the users are required to buy commercially available transfer sheets, and the same disadvantages described above are more or less encountered. In particular, if the user requires specific indicia of his own choice of color and design in relatively small numbers, the photographic method is not justifiable.

SUMMARY OF THE INVENTION

It is therefore an object of the present invention to provide a simple and economical method of preparing a dry transfer sheet, which method permits easy transfer of images or indicia desired by the user, to a carrier sheet of the dry transfer sheet.

It is another object of the invention to provide a simple and economical method of preparing a dry transfer sheet, which method assures a reduced image transfer cost per character, for example, while preventing wasting of images or indicia such as letters and graphic indicia on the prepared dry transfer sheet.

A further object of the invention is to provide a simple and economical method of preparing a dry transfer sheet, which method allows the user to readily lay out a desired indicia such as a word, phrase or a sentence, or formulate a desired or unique graphic design.

The above objects may be achieved according to the principle of the present invention, which provides a method of preparing a dry transfer sheet for transferring indicia such as characters and designs to a receiving surface of a receiving member, comprising the steps of: (a) preparing a heat-sensitive ink ribbon which has an ink layer consisting of a thermally fusible ink composition; (b) preparing a thermal printer having a print head for heating selected portions of the ink layer; (c) setting the heat-sensitive ink ribbon and a carrier sheet on the thermal printer, such that the ink ribbon is interposed between the print head and the carrier sheet; (d) entering printing data representative of desired indicia into the printer; and (e) activating the print head according to the entered printing data, in order to heat local portions of the ink layer which correspond to the desired indicia, and thereby transfer the ink composition from the heated local portions to an image-receiving surface of the carrier sheet, whereby the desired indicia are printed on the image-receiving surface with the transferred ink composition.

The method of the present invention as described above permits easy manufacture of a dry transfer sheet by thermal printing on a suitable carrier sheet, by using a heat-sensitive ink ribbon, and a thermal printer such as those incorporated within a typewriter or a text or word processing system. Namely, only the desired indicia such as letterings and graphic designs may be thermally printed on the carrier sheet. Accordingly, no indicia or images on the dry transfer sheet are wasted as often experienced when conventional commercially available dry transfer sheets are used. Therefore, a cost per letter or character to be transferred, or per unit area of a dry transfer sheet can be lowered. Further, the instant method effectively utilizes text processing capability of a typewriter or word processor, and consequently permits easy layout of letterings or graphic designs to be printed on the carrier sheet, i.e., easy layout of the images to be transferred from a dry transfer sheet to a desired receiving surface. Thus, the present method enables the user of a typewriter or word processor, for example, to prepare a dry transfer sheet at any time, to transfer desired images to a desired receiving member such as a paper, plastic or metallic sheet or article.

According to one feature of the present invention, the print head of the thermal printer used has a heat-generating unit wherein an array of heat-generating elements are arranged such that a centerline of the array of the heat-generating elements is spaced by a distance of 50–500 microns, away from a trailing end of the print head as viewed in a direction of printing. Further, the printing conditions are determined so as to satisfy the formulas: $Y > 1.4 \times 10^{-4} X^2 + Z$, where $Z = (10\alpha + 25)/3$, and where X is a force (g) by which the print head is pressed against the carrier sheet via the ink ribbon, Y is a torque (gf·cm) of a take-up spool by which the ink ribbon is pulled, $\alpha$ is an angle (degree) of the print head with respect to the image-receiving surface of the carrier sheet.

The pressing force X of the print head, the ribbon take-up torque Y and the print head angle to the carrier sheet, which are determined so as to satisfy the above formula, make it possible to perform excellent thermal printing via the ink ribbon, on the image-receiving surface of the carrier sheet which generally has a relatively low value of wettability for easier transfer of the printed images from the carrier sheet (dry transfer sheet). The printing conditions thus determined assure fine printed images, without depression, collapse, spreading, expansion, scratching or other defects of the ink material transferred from the ink ribbon to the carrier sheet to form the printed images.

In one form of the above feature of the invention, the force X is within a range of 100–500 g, and the angle of the print head is within a range of 0°–8°.

According to another feature of the invention, the carrier sheet has a thickness of 25–200 microns, and the image-receiving surface of the carrier sheet has a surface characteristic represented by a contact angle of at least 95° with respect to a mass of water laid thereon. This characteristic insures better printing of images on the image-receiving surface of the carrier sheet via the ink ribbon, and better transfer of the printed images from the carrier sheet or dry transfer sheet to a desired receiving member.

In one form of the above feature of the invention, the image-receiving surface of the carrier sheet is provided by a material selected from the group consisting of polyethylene, polypropylene and fluorine-contained resin, whereby the image-receiving surface is given the contact angle. Alternatively, the carrier sheet includes a support base formed from a material selected from the group consisting of a paper, a metallic foil and a plastic film. In this case, a release layer is formed on the support base. The release layer consists of a silicone resin, and provides the image-receiving surface which has the contact angle.

According to a further feature of the invention, the heat-sensitive ink ribbon further has a substrate in the form of a film on which the ink layer is formed, and a top coat formed on the ink layer. The ink composition comprises a coloring agent, a binder and a pressure-sensitive adhesive. The top coat consists of a top coat composition which comprises a first resin material that is a heat-sensitive adhesive, and a second resin material for increasing tackiness of the ink layer. The top coat has higher values of adhesive strength under heat, hardness, and cohesive strength, than the ink layer. In this instance, the ink material which consists of the ink composition and the top coat composition include both the pressure-sensitive adhesive material and the heat-sensitive adhesive material. Accordingly, the ink material transferred from the ink layer of the ink ribbon can be easily adhered to the image-receiving surface of the carrier sheet having a low degree of wettability, and to the receiving surface of the desired receiving member or article.

In one form of the above feature of the invention, the ink composition has a viscosity of not exceeding 3000 cps at 95° C., and the top coat composition has a viscosity of at least 3000 cps at 95° C. In another form of the same feature of the invention, the top coat composition comprises polyamide as the first resin material, and hydrogenated rosin as the second resin material. The top coat composition may further comprise an inorganic or organic powder, such as a metallic soap, in an amount of not exceeding 20% by weight.

In a further form of the above feature of the invention, the top coat composition comprises polyamide as the first resin material, and rosin ester as the second resin material.

In a still further form of the same feature of the invention, the top coat composition further comprises a lubricant. The lubricant may be selected from the group consisting of: higher fatty alcohol such as stearyl alcohol; glycerin ester such as stearic acid monoglyceryl ester; sorbitan ester such as sorbitan monostearate, sorbitan monopalmitate; higher fatty acid such as stearic acid; oily wax such as hardened castor oil; monoamide such as stearic acid amide; bisamide such as ethylene bisstearic acid amide; hydroxy-fatty acid such as 12-hydroxystearic acid; and ester such as butyl stearate.

According to a yet further form of the above feature of the invention wherein the top coat composition comprises the first and second resin materials, the binder of the ink composition contains as a major component at least one wax, at least 80% by weight of the at least one wax having a penetration value of not exceeding 50 at 55° C. In this case, the softening temperature of the ink material is raised, and therefore the ink ribbon can be properly stored in the form of a roll at a relatively high storage room temperature, without sticking of the top coat to the back of the substrate, or disordering of winding of the roll.

According to another form of the same feature of the invention, the top coat composition further comprises a high-molecular surface modifier. The high-molecular surface modifier may comprise a fluorine-contained resin or a silicone polymer. The inclusion of the surface modifier assures better feeding and improved storage durability of the ribbon.

According to a still further feature of the invention, the carrier sheet includes a transparent or translucent support base which has the image-receiving surface, and an opaque layer provided on one of opposite sides of the support base remote from the image-receiving surface. This opaque layer may be used to detect the carrier sheet on the printer, by detecting a light beam which is reflected by the opaque layer, if this opaque layer is formed of a material which reflects the light beam. Alternatively, the opaque layer may be formed of a material which absorbs a certain wavelength band of a light beam. In this case, the carrier sheet is detected by sensing the absence of the absorbed wavelength. Thus, the opaque layer makes it possible to sense and position the carrier sheet, even though the support base is transparent or translucent. Preferably, the opaque layer is separated from the support base of the carrier sheet after the indicia are printed on the image-receiving surface of the carrier sheet.

In one form of the above feature of the invention, the opaque layer or support base has markers on at least one of opposite surfaces thereof. The markers are useful to determine the area of the carrier sheet in which the indicia are printed. The markers are also useful when it is necessary to cut off a portion of the dry transfer sheet which bears the desired images or indicia to be transferred to a receiving surface. The markers may consist of a plurality of parallel lines parallel to opposite edges of the carrier sheet.

In another form of the above feature of the invention, the carrier sheet further includes adhesive means interposed between the support base and the opaque layer, for partial bonding between the support base and the opaque layer. If the opaque layer is bonded to the support base over the entire surface area, the carrier sheet tends to crease during a storage period, due to a difference in expansion coefficient between the support base and the opaque layer.

According to one arrangement of the above form of the invention, the adhesive means may be adapted to permit the opaque layer to be separated from the support base. The adhesive means may consist of an adhesive band provided along one edge of the carrier sheet. In this case, the opaque sheet remains adhered to the support base, even after a portion of the carrier sheet is cut off along a line perpendicular to the adhesive band.

According to another arrangement of the same form of the invention, the adhesive means consists of a pair of adhesive pads provided at adjacent two corners of the carrier sheet.

According to a further arrangement of the same form of the invention, the adhesive means includes at least one pair of adhesive bands provided along opposite edges of the carrier sheet. In this case, too, the opaque layer remains adhered to the support base even after a portion of the carrier sheet is cut off along a line perpendicular to the adhesive bands.

In a still further form of the above-indicated feature of the invention wherein the carrier sheet includes the support base and the opaque layer, the carrier sheet further includes an adhesive layer interposed between the support base and the opaque layer, for bonding of the opaque layer to the support base over an entire surface area of the opaque layer. In this case, the opaque layer having a plurality of cuts formed through a thickness thereof, so as to divide the opaque layer into a plurality of divisions. This arrangement is also effective to prevent creasing of the carrier sheet due to a difference in expansion coefficient between the support base and the opaque layer. Further, the adhesive layer holds the opaque layer adhered to the support base even after a portion of the carrier sheet is cut off.

In a yet further form of the above feature of the invention, the carrier sheet further includes a release layer provided on one of opposite surfaces of the support base remote from the image-receiving surface, and an adhesive layer interposed between the release layer and the opaque layer. The release layer has a smaller surface area than the support base, the adhesive layer and the opaque layer, so that a portion of the adhesive layer contacts a corresponding portion of the support base, and thereby directly bonds the opaque layer to the corresponding portion of the support base. In this case, otherwise possible creasing of the carrier sheet is avoided because of the presence of the release layer between the support base and the opaque layer. Further, the opaque layer may be adhered to the support base by cutting off a portion of the release layer, even after the corresponding portion of the carrier sheet is cut off. For this purpose, the release layer preferably has a plurality of cuts formed through a thickness thereof, so as to divide the release layer into divisions.

BRIEF DESCRIPTION OF THE DRAWINGS

The above and other objects, features and advantages of the present invention will be better understood by reading the following description of the invention, together with presently preferred embodiments of the invention, when considered in connection with the accompanying drawings, in which:

FIG. 1 is a fragmentary elevational view showing a method of a dry transfer sheet according to one embodiment of the invention, by using a thermal printhead;

FIG. 2 is an elevational view of the thermal print head of FIG. 1, showing a surface of the head facing an ink ribbon;

FIG. 3 is a plan view illustrating a thermal printing operation wherein images are transferred to a carrier sheet;

FIG. 4 is a fragmentary view in cross section of an ink ribbon used for the thermal print head of FIG. 1;

FIG. 14(*b*) is a cross sectional view taken along line 14—14 of FIG. 14(*a*);

FIG. 17 is a plane view of a carrier sheet used according to another embodiment of the invention;

FIG. 18 is a cross sectional view taken along line 18—18 of FIG. 17;

FIG. 19 is a plan view of a carrier sheet used in a further modified embodiment of the invention;

FIG. 20 is a cross sectional view taken along line 20—20 of FIG. 19;

FIG. 21 is a cross sectional view taken along line 21—21 of FIG. 19, showing a dry transfer sheet prepared from the carrier sheet of FIGS. 19 and 20;

FIGS. 22 and 23 are plan and cross sectional views of a carrier sheet used in a still further modified embodiment of the invention; and FIG. 24 is a cross sectional view taken along line 24—24 of FIG. 22, showing a dry transfer sheet prepared from the carrier sheet of FIGS. 22 and 23.

DETAILED DESCRIPTION OF THE INVENTION

As described above, the method of the present invention is practiced by using a printing apparatus of the type using a thermally fusible ink material. For instance, the printing apparatus may be a stand-alone printer, or a printing arrangement or unit incorporated within a typewriter or a word or text processing system. Such printers, typewriters and word processors have been produced in a rapidly increasing scale, and are available at a considerably reduced cost. According to the invention, dry transfer sheets are prepared by transferring desired indicia to a suitable carrier sheet, by a printer using a thermally fusible ink material, as indicated above. An example of the present method is illustrated in FIGS. 1–5.

Figure 5:
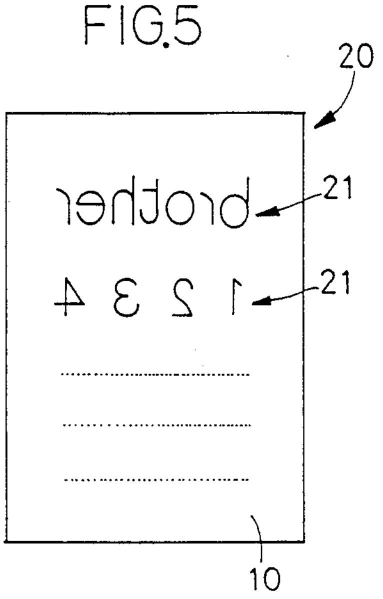
FIG. 5 is a plan view of an example of a dry transfer sheet prepared by the method shown in FIGS. 1 and 3.

Referring first to FIG. 1, reference numeral 10 designates a carrier sheet to which desired letters, designs and other indicia are transferred to prepare a dry transfer sheet. The transfer of the desired indicia is carried out on a thermal printer which includes a thermal print head 13. The images transferred to the carrier sheet is either laterally reversed as indicated in FIG. 5, or non-reversed. Described more specifically, the desired indicia such as characters (letters, numbers and symbols) and graphic designs are entered into the thermal printer in the form of a typewriter or word processor system, through a suitable input device such as a keyboard. According to the entered information representative of the desired indicia, a heat-generating unit 14 of the thermal print head 13 is activated to generate heat for softening or fusing an ink material in selected areas of a thermal or heat-sensitive ink ribbon 15, so that the ink material is transferred from the softened areas onto the surface of the carrier sheet 10. Thus, the desired images are thermally printed on the sheet 10 via the ink ribbon 15. This ribbon will be described in detail.

In order for the thermal printer to effectively and adequately transfer or print the desired indicia to or on the carrier sheet 10, it is necessary to correctly control or adjust the following parameters such as position of the heat-generating unit 14 of the print head 13 relative to the ink ribbon 15; configuration of the heat-generating unit 14; torque of a take-up spool for the ink ribbon 15, a force by which the print head 13 is pressed onto the carrier sheet 10; angle of the print head 13 relative to the carrier sheet 10; amount of energy input to the print head 13; and printing speed of the print head 13. As shown in FIG. 2, the heat-generating unit 14 consists of an array of a plurality of resistors or heat-generating elements 14*a*, 14*b*, 14*c*, etc. which are selectively activated to heat the selected local areas of the ink ribbon 15.

Although the present illustrated method uses the thermal print head 13 which has the heat-generating array 14 adapted to generate heat to fuse the ink material on the ink ribbon 15, the thermal print head 13 may be replaced by a print head which have recording electrodes or needles that are selectively energized. In this case, the ink ribbon consists of an electrically resistive layer and an ink layer, so that selected portions of the resistive layer are heated by energized adjacent recording electrodes of the print head, and the ink material on the consequently heated corresponding portions of the ink layer is softened or fused for transfer to the carrier sheet 10.

FIG. 2 shows the surface of the thermal print head 13 which faces the ink ribbon 15. As is apparent from FIGS. 2 and 3, the array of the selectively energizable heat-generating elements 14*a*, 14*b*, 14*c*, etc. of the heat-generating unit 14 is positioned close to the trailing end of the print head 13, as viewed in the direction of printing movement of the head 13, i.e., in the printing direction indicated at B in FIG. 3. More specifically, the heat-generating elements 14*a*, 14*b*, 14*c*, etc. are arranged in a vertical row, such that the centerline of the row or array is spaced apart from the extreme trailing end of the head 13 by a distance of 50–500 microns, preferably 50–250 microns.

The positioning of the heat-generating unit 14 close to the trailing end of the print head 13 makes it possible to release the ink material from the surface of the carrier sheet 10 while the ink material of the ink ribbon 15 is still in a molten or fused state. This is very significant, particularly because the surface of the carrier sheet 10 to which the ink material is transferred has generally a low wettability. If the ink ribbon 15 is released from the carrier sheet 10 after the fused material is substantially cooled, the transfer of the ink material to the carrier sheet 10 is extremely difficult, or cannot be achieved adequately, because a cohesive strength of the ink material, or an adhesive strength between the ink material and the ribbon substrate becomes larger than an adhesive strength between the ink material and the carrier sheet 10.

Further, a force X (g) by which the print head 13 forces the ink ribbon 15 against the carrier sheet 10, a take-up torque Y (gf·cm) of the take-up spool for pulling the ink ribbon 15 in a direction A (FIG. 3), and an angle $\alpha$ (degrees) of the print head 13 with respect to the carrier sheet 10, must be determined so as to satisfy the following formulas, in order to insure adequate transfer of the ink material (in the form of desired indicia) to the carrier sheet 10:

$$Y > 1.4 \times 10^{-4} X^2 + Z$$

$$Z = (10\alpha + 25)/3$$

Usually, the surface of the carrier sheet 10 to which the ink material is transferred by printing has a comparatively low degree of wettability, for better adhesion of the ink material to the sheet 10 by applying a pressure to the ink material. Accordingly, the friction force between the ink material on the ink ribbon 15 and the surface of the carrier sheet 10 is considerably small. Consequently, if the ribbon take-up torque Y becomes smaller than the friction force between the print head 13 and the ink ribbon 15, and the tensile force of the print head 13 against the ink ribbon 15 in the printing direction B, the ink ribbon 15 may slide on the carrier sheet 10 together with the print head 13 in the printing direction B. To avoid this problem, the ribbon take-up torque or force Y must be larger than the value indicated in the above formulas In the present example, the carrier sheet 10 consists of a support base 11 and a release layer 12 formed on the base 11. The support base 11 may be made of paper, or formed from a metal foil or a plastic film. The plastic film is preferably formed of polyethylene terephthalate (PET), polyethylene, polypropylene, nylon, polyimide, fluorine-contained resin or fluoroethylene resin, vinyl chloride, polysulfone, polycarbonate, or ABS resin. The release layer 12 is provided to improve the releasability of the carrier sheet 10, so that the ink material printed on the carrier sheet 10 can be readily transferred from the sheet 10 (dry transfer sheet 20 as indicated in FIG. 5, which will be described) to a desired receiving surface. For example, the release layer 12 consists of a coating of silicone resin. However, the carrier sheet may consist solely of a plastic film, if the plastic film has a smooth surface having a high degree of releasability, or a low degree of wettability. In either case, the surface of the carrier sheet 10 must have a contact angle of at least 95° preferably at least 105°, relative to a water mass supported thereon.

Since the surface of the carrier sheet 10, i.e., the surface of the release layer 12 of silicone resin in this specific example has a low degree of wettability and a high degree of releasability, as described above, the ink material is difficult to be adhered to the surface of the sheet 10, and is easily rubbed away or spread from the nominal position. To avoid this problem, it is desirable that the angle $\alpha$ of the thermal print head 13 relative to the carrier sheet 10 be maintained within a range of 0°–8°, preferably 0°–5°, for minimizing the pressure between the print head 13 and the carrier sheet 10. For the same reason, it is desirable to minimize the force X exerted by the print head 13 against the carrier sheet 10. The force X is maintained within a range of 100–500 g, preferably 100–300 g.

For facilitating positioning or registering of the images printed on the carrier sheet 10 (dry transfer sheet 20) relative to the receiving surface to which the images are transferred, it is preferred that the carrier sheet 10 be transparent or translucent. The translucent nature the carrier sheet 10 is more preferable, since the images printed on the carrier sheet 10 are usually more easily observed if the sheet 10 is translucent. Further it s desirable that the carrier sheet 10 has a suitable degree of flexibility, in order to facilitate application of a pressure to the back of the sheet 10 when the images are transferred to the receiving surface.

While the carrier sheet 10 must have a relatively high surface smoothness with minimum pin holes or insuring high quality of images transferred thereto by thermal printing, the flexibility of the carrier sheet 10 is also important for better printing quality where the printing is effected with the sheet 10 being supported on a cylindrical platen of the printer For this reason, the thickness of the carrier sheet 10 is held within a range of 25–200 microns, preferably 50–150 microns.

The heat-sensitive ink ribbon 15 used by the printer to transfer desired indicia to the carrier sheet 10 may be an ink ribbon as commonly used for a thermal print head, which carries an ink material consisting principally of a wax coated on a substrate. However, it is preferable that the ink ribbon 15 has a two-layered structure which consists of an ink layer, and a top coat which is formed on the ink layer, so as to improve the transfer characteristics of the ink material of the ink layer under heat and pressure. More particularly, the material of the top coat has higher or greater adhesive strength under heat, hardness, viscosity and cohesive strength, than the ink layer. During printing on the carrier sheet 10, the top coat having these properties gives the ink material of the ink layer increased ease of adhesion under heat to the surface of the carrier sheet 10 which has relatively low wettability. Further, the top coat permits better adhesion of the ink material from the sheet 10 under pressure to a receiving surface.

Referring to FIG. 4, there is illustrated an example of the heat-sensitive ink ribbon 15 which includes a sheet-like substrate 16, an ink layer 17 consisting of an ink material formed on one of opposite surfaces of the substrate, and a top coat 18 which covers the ink layer 17. The ink ribbon 15 further includes an anti-sticking layer 19 formed on the other surface of the substrate 16. The anti-sticking layer 19 is made of a heat-resistant resin such as silicone resin.

The substrate 16 which supports the ink layer 17 of the heat-sensitive ink ribbon 15 used for thermal printing on the carrier sheet 10 is made of any one of various materials suitable for a substrate of known heat-sensitive ink ribbons that have been used for preparing dry transfer sheets. Since the ink ribbon 15 is used in contact with the thermal print head 13 of the printer, the substrate 16 is preferably made of a material having a heat resistance of at least 150° C., such as polyester, polyimide, polycarbonate, polysulfone, polyether sulfone, polyphenylene sulfide, or similar resin materials, and condenser paper, glassine paper (glazed grease-proof paper) or similar paper materials. The thickness of the substrate 16 is suitably determined depending upon the material used. A generally preferred range of thickness of the substrate 16 is between 3 and 30 microns.

The ink layer 17 is made of a material whose major components include a coloring or chromogenic material, a binder, and a pressure-sensitive adhesive material. The coloring agent principally consists of a pigment such as carbon black, and may include a suitable dye, as needed, for toning adjustment of the printed images.

The binder used for the ink layer 17 includes, as major components, a wax composition, and a tackifier such as petroleum resin, rosin resin, ketone resin, polyamide resin, and phenolic resin. The wax composition consists of at least one wax material selected from the group which consists of: plant wax such as candelilla wax, carnauba wax, rice wax and Japan wax or tallow; animal wax such as bees wax, lanolin, and spermaceti; mineral wax such as montan wax, and cerresine; and petroleum wax such as paraffin wax, and microcrystalline wax. The wax composition may include a resin wax such as copolymer of -olefin and maleic anhydride. The tackifier is used to increase the adhesive strength, hardness, cohesive strength, and tackiness of the ink material, and the tackiness of the pressure-sensitive adhesive material. Generally, the ratio by weight of the wax composition to the tackifier of the binder material is held within an approximate range between 15:1 and 3:2.

Preferably, at least 80% by weight of the wax composition consists of at least one wax material whose penetration value at 55° C. is 50 or lower, such as candelilla wax, carnauba wax, or some members of the paraffin wax group.

The pressure-sensitive adhesive material contained in the ink layer 17 consists of at least one member selected from the group consisting of: high-molecular vinyl such as polyvinyl chloride, acrylic polymers or copolymers, copolymer of ethylene and vinyl acetate, copolymer of ethylene and ethylacrylate, polyvinyl acetate, polyvinyl ether, polyvinyl acetal, and polyisobutylene; high-molecular fibrous material such as ethyl cellulose, nitrocellulose and cellulose acetate; and high-molecular rubbery material such as rubber chloride and natural rubber.

Generally, the mixing ratio of the coloring agent, binder and pressure-sensitive adhesive material of the ink layer 17 is approximately 5–30:40–93:2–30. Preferably, these materials are mixed so as to give an ink composition whose viscosity is 3000 centipoise or lower, preferably between about 200 and about 1000 centipoise at 95° C. or lower. The ink composition is dissolved or dispersed in a suitable solvent to prepare an ink liquid, or the components are mixed under heat, to prepare an ink mixture. The prepared ink liquid or mixture is applied to the substrate 16, by a suitable known method such as hot-melt coating technique.

The top coat 18 formed on the ink layer 17 is formed from a composition which has higher viscosity and adhesive strength (when heat is applied during thermal printing), and higher hardness and cohesive strength, than the ink composition. Accordingly, the top coat 18 assures improved ease of transfer of the ink material to the surface of the carrier sheet 10 which has a relatively low degree of wettability. The comparatively high cohesive strength, viscosity and hardness of the top coat composition are effective to prevent otherwise possible troubles during transfer of the ink material from the ribbon 15 to the carrier sheet 10, such as depression, collapse or spreading of the transferred ink masses, or displacement of the transferred ink due to the movement of the print head 13. Further, the comparatively high cohesive strength and hardness of the top coat 18 contribute to better transfer of the printed images from the carrier sheet 10 (prepared dry transfer sheet 20 shown in FIG. 5) to the surface of a desired receiving member (indicated at 30 in FIG. 6). Namely, the top coat 18 enables the ink material on the dry transfer sheet 20, to be easily transferred to the desired receiving surface, without a residue left on the surface of the carrier sheet 10, and without partial removal, or spreading of the transferred ink material on the receiving surface. In addition, the top coat 18 serves to protect the ink material on the carrier sheet 10 of the dry transfer sheet 20 in the unused state.

The composition of the top coat 18 principally consists of at least one first resin which has relatively high film formability, and relatively high adhesive strength under heat, and at least one second resin which has relatively high cohesive strength and tackiness. The first resin or resins are selected from the group which includes: copolymer of ethylene and vinyl acetate; polyvinyl acetate; ionomer; acrylic polymber; copolymber of ethylene and ethyl acrylate; copolymer of ethylene an acrylic acid; copolymer of vinyl chloride and vinyl acetate; polyvinyl butyral; polyvinyl pyrrolidone; polyvinyl alcohol; polyamide; and ethyl cellulose. The second resin includes petroleum resins, rosin, hydrogenated rosin, rosin ester, ketone resin and phenolic resin. The first and second resins are mixed such that the ratio by weight of the second resin to the first resin is generally 0.5–10, preferably 0.8–7.

For instance, the major components of the top coat composition 18 consist of 20–70% by weight of polyamide as the first resin, and 80–30% by weight of hydrogenated rosin as the second resin. The polyamide is a resin which is usually used with a hot-melt adhesive or an ink material for gravure printing, and which has a melting point of about 90°–130° C. Although this resin is suitable for forming a layer which is easily transferred at an elevated temperature, this material alone does not permit the ink material to be transferred from the heated portions of the ink layer 16, so as to insure excellent thermal printing of the desired images on the carrier sheet 10, without partial failure of transfer of the images to the carrier sheet 10. In view of this fact, hydrogenated rosin is added as the second resin to the first polyamide resin, in order to increase the adhesive strength between the polyamide resin and the ink material of the ink layer 17, and thereby provide the ink material with increased cohesive strength, hardness and tackiness, which are necessary to achieve thermal printing in a correct manner.

The hydrogenated rosin as the second resin indicated above may be replaced by rosin ester which has a softening point of 80° C. or higher, and a relatively low tackiness value at 55° C. or lower, so that the top coat 18 is not tacky or sticky at an operating temperature of 5°–35° C., so as to allow smooth feeding of the ink ribbon 15. Further, the top coat 18 containing the rosin ester remains on the ink layer 17 even if the ink ribbon 15 is kept at 55° C. The rosin ester consists of a functional group of —OH, —COOH of rosin to which an organic acid, alcohol or metallic ions are connected. Since the rosin ester has higher melting and softening points than the hydrogenated rosin, its properties are more preferred for the reasons stated above.

The top coat 18 may include as an additional major component at least one lubricant selected from the group which includes: high-quality alcohol such as stearyl alcohol; glycerin ester such as stearic acid monoglyceryl ester; sorbitan ester such as sorbitan monostearate, sorbitan monopalmitate; fatty acid such as stearic acid; oily wax such as hardened castor oil; monoamide such as stearic acid amide; bisamide such as ethylene bisstearic acid amide; hydroxy-fatty acid such as 12-hydroxystearic acid; and ester such as butyl stearate. In this case, the lubricant or lubricants is/are used in 0.05–10 parts by weight, for 100 parts by weight of a sum of the first and second resins. These lubricant materials are used to raise the softening point of the top coat 18, prevent blocking of the ink layer 17 and the top coat 18 with respect to the back of the ribbon 15, reduce the tackiness or stickiness on the surface of the top coat 18, permit the storage of the ink ribbon 15 at a relatively high environmental temperature, and allow smooth feeding of the ribbon 15.

The above-indicated at least one lubricant indicated above may be replaced by at least one high-molecular surface modifier such as fluorine-contained resin (fluoroethylene resin) or silicone polymer. The surface modifier serves to reduce the tacky or sticky nature, and frictional resistance of the surface of the top coat 18, so as to permit smooth feeding of the ink ribbon 15. Further, the surface modifier serves to maintain the top coat 18 in good condition even if the ribbon 15 is stored at a relatively high temperature.

The top coat 18 may contain both of the above-indicated lubricant and surface modifier. In this case, the lubricant and surface modifier are used in a total amount of 0.05 to 10 parts by weight, for 100 parts by weight of the first and second resins indicated above.

The composition of the top coat 18, which includes the first and second resin materials, and optionally includes the lubricant and/or surface modifier, as described above, is prepared in the form of a solution or dispersion in water, or an organic solvent which does not react with the composition of the ink layer 17. The prepared solution or dispersion is applied by a suitable known method to the ink layer 17, so that the top coat 18 has a predetermined thickness. The thus formed top coat 18 has a higher viscosity than the ink layer 17, at an operating temperature during thermal printing by the thermal head 13. The viscosity of the top coat 18 is generally 3000 centipoise or higher, preferably 10000 centipoise or higher, at 95° C.

To adjust the strength of the top coat 18, and assure sharp or neat printing of images by the ink material without contamination, the top coat 18 may further include a filler such as kaolin, talc, bentonite and titanium oxide, and/or organic or inorganic powder such as metallic soap consisting of zinc stearate or aluminum stearate. These additives are present in an amount not exceeding 20% by weight of the total content of the top coat composition.

The ink ribbon 15 and the carrier sheet 10 are set on the thermal printer having the thermal print head 13 with the heat-generating elements 14*a*, 14*b*, 14*c*, etc., such that the pressing force X of the print head 13, the take-up torque of the ribbon 15, and the angle $\alpha$ of the print head 13 are adjusted as described before. With the print head 13 operated according to input data, desired images such as letters or designs are printed on the carrier sheet 10, due to transfer of the ink material from the selectively heated areas of the ink ribbon 15, whereby the dry transfer sheet 10 as shown in FIG. 5 is prepared. In this figure, reference numeral 21 designates the printed images, or ink material transferred to the carrier sheet 10 of the dry transfer sheet 20.

According to the instant method wherein the thermal printing is effected under the conditions described above, by using the ink ribbon 15 constructed as described above, the ink material which gives the desired images can be transferred from the ink ribbon 15 to the surface of the carrier sheet 10 having relatively low wettability, without any substantial printing defects, such as spreading or expansion, depression or collapse, scratching, pin holes, or fluctuating density of the transferred images on the carrier sheet 10, and without displacement of the transferred images due to the movement of the print head 13, or partial failure of transfer of the ink material.

Figure 7:
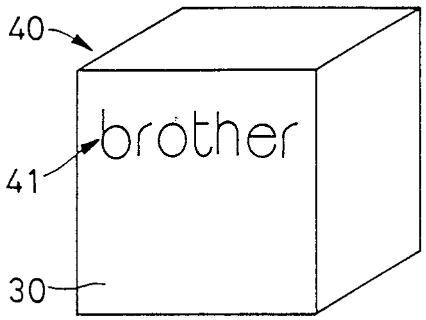
FIG. 7 is a perspective view showing the transferred images on a receiving member.
Figure 6:
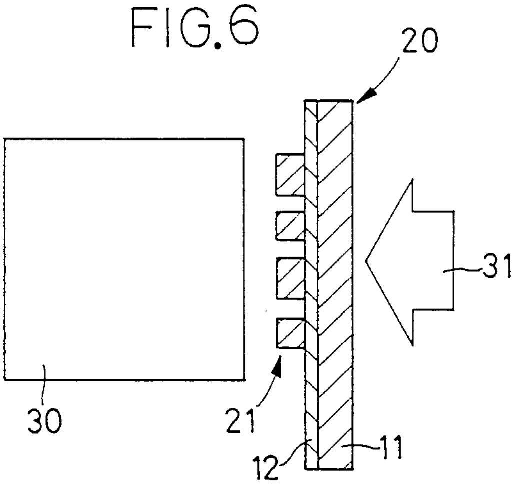
FIG. 6 is an elevational view illustrating a manner of transferring images from the prepared dry transfer sheet to a receiving surface.

The thus prepared dry transfer sheet 20 is subsequently used for transferring the images 21 to a desired receiving surface 30 of a receiving member 40, as illustrated in FIGS. 6 and 7. The receiving surface 30 may consist of a paper, plastic, metal or other material. Usually, the images 21 transferred to the carrier sheet 10 of the dry transfer sheet 20 are laterally reversed with respect to the images 41 transferred to the receiving surface 30, as indicated in FIGS. 5 and 7. When the image transfer is effected from the dry transfer sheet 20 to the receiving surface 30, a suitable pressure is applied to the back of the transfer sheet 20, as indicated at 31 in FIG. 6, in order to insure better adhesion of the transferred images 41 to the receiving surface 30. According to the instant dry transfer sheet 20, any residual ink material will be left on the surface of the carrier sheet 10 after the image transfer action on the transfer sheet 20 is completed.

Figure 8:
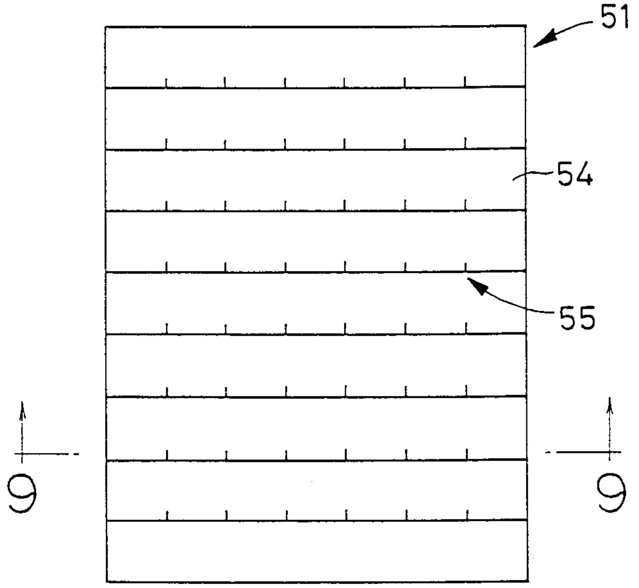
FIG. 8 is a view of a carrier sheet used to prepare a dry transfer sheet, according to another embodiment of the invention.
Figure 9:
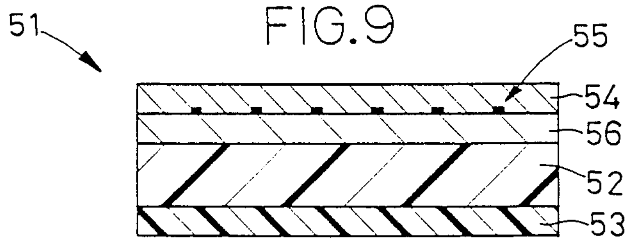
FIG. 9 is an elevational view in cross section taken along line 9—9 of FIG. 8.

Referring to FIGS. 8 and 9, there is shown a modified carrier sheet 51 used in place of the carrier sheet 10 described above. This modified carrier sheet 51 an opaque layer 54, and an adhesive layer 56, in addition to a support base 52 and a release layer 53 which are similar to the support base 11 and release layer 12 of the carrier sheet 10, respectively. Namely, the adhesive layer 56 is formed on the support base 11, and the opaque layer 54 is formed on the adhesive layer 56. The adhesive layer 56 bonds the opaque layer 54 to the base 52, such that the opaque layer 54 can be removed or separated from the base 52. However, the adhesive layer 56 and the release layer 53 are not essential.

Figure 10:
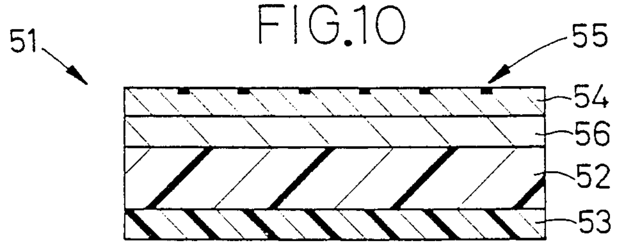
FIG. 10 is an elevational view in cross section corresponding to that of FIG. 9, showing a carrier sheet according to a further embodiment of the invention.

The opaque layer 54 bears markers 55 adjacent to the interface with the adhesive layer 56. However, the markers 55 may be formed on the outer or exposed surface of the opaque layer 55, as shown in FIG. 10.

The support base 52 is a transparent or translucent plastic film, or a laminar paper or metal foil, which has a thickness of 50–200 microns, as described above with respect to the support base 11 of the carrier sheet 10.

The opaque layer 54 is either a light reflecting layer or a light absorbing layer. In either case, the opaque layer 54 is provided for the purpose of checking whether the carrier sheet 51 is set in position on the printer. In the former case, the opaque layer 54 is made of a paper, plastic or metal foil which has a sufficiently high reflectance, so that a light reflected by the reflecting layer 54 can be detected by a reflection-type photosensor. In the latter case, the presence of the carrier sheet 51 is checked by detecting an amount of light which has passed through the opaque layer 54. In this case, therefore, the opaque layer 54 is made of a paper, plastic or other suitable known material which absorbs light of a certain wavelength range.

The markers 55 are formed in a desired pattern on one of opposite surfaces of the opaque layer 54, by a suitable printing technique, with a known printing ink or paint.

The adhesive layer 56 consists of an ordinary adhesive, which bonds the opaque layer 54 to the support base 52 but permits easy release of the opaque layer 54 from the base 52, when the printed images are transferred from the release layer 53 to a desired receiving surface.

For increasing the adhesive strength between the base 52 and the release layer 53, and/or between the base 52 and the opaque layer 54, a suitable anchor coat or surface treating coat may be applied to the appropriate surface or surfaces of the base 52.

Figure 11:
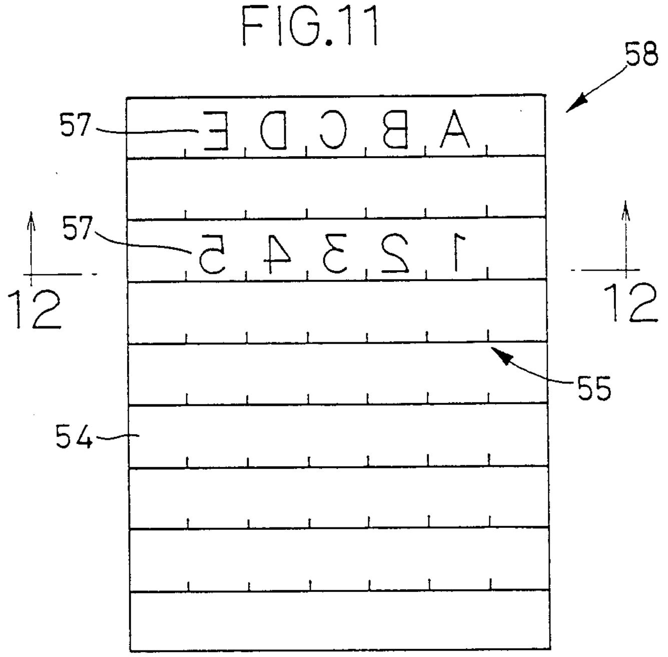
FIG. 11 is a plan view of the dry transfer sheet prepared according to the method of FIG. 8.
Figure 12:
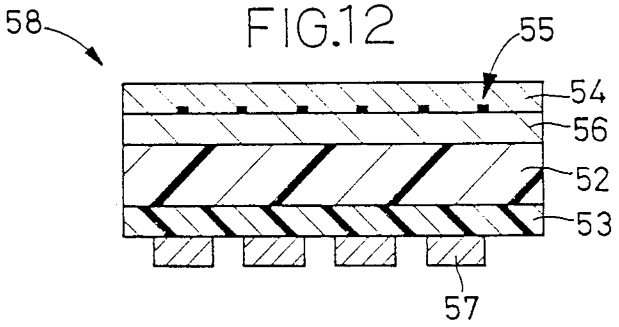
FIG. 12 is an elevational view in cross section taken along line 12—12 of FIG. 11.
Figure 13:
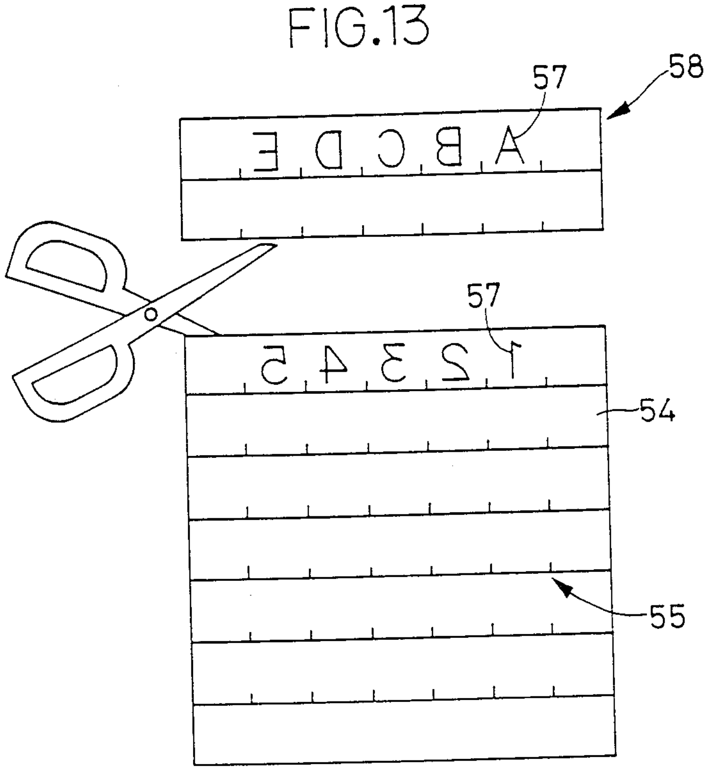
FIG. 13 is an illustration showing a manner of cutting the dry transfer sheet of FIG. 11.

During a thermal printing operation on the carrier sheet 51 to produce a dry transfer sheet 58, the markers 55 formed on the opaque layer 54 enable the user to readily check whether images 57 are printed at desired locations on the carrier sheet 51, as indicated in FIGS. 11 and 12. The markers 55 are further useful when the dry transfer sheet 58 is used to transfer the images 57 from the printed portion of the carrier sheet 51. Namely, the printed portion of the dry transfer sheet 58 is first cut off while observing the markers 55, as indicated in FIG. 13. Then, the corresponding portion of the opaque layer 54 is separated from the corresponding portion of the carrier sheet 51 of the dry transfer sheet 58. The cut portion of the carrier sheet 51 bearing the images 57 to be transferred is aligned with a desired area of the receiving surface, and is then pressed against the receiving surface, whereby the images 57 are transferred to the receiving surface.

Since the once prepared dry transfer sheet 58 can be cut neatly along the markers 55, the rest of the carrier sheet 51 can be re-used when necessary, to prepare similar dry transfer sheets for transferring desired images at later opportunities.

While the markers 55 are provided on the opaque layer 54 in the above embodiments, the markers 55 may be provided on the support base 52, if desired.

Figure 14A:
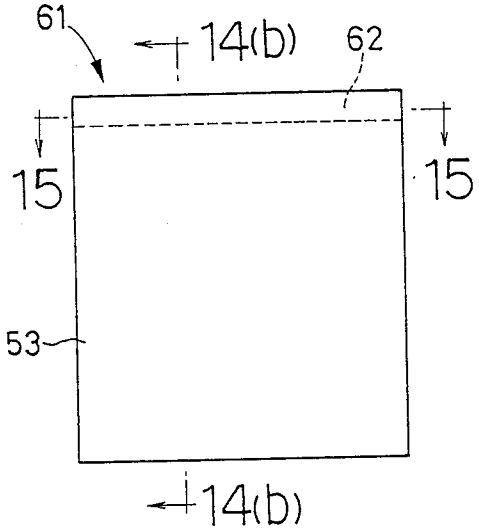
FIG. 14(*a*) plan view of a carrier sheet used in a still further embodiment of the invention.
Figure 14B:
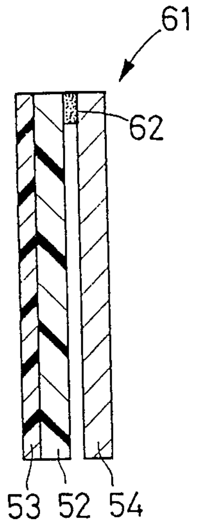
Figure 15:
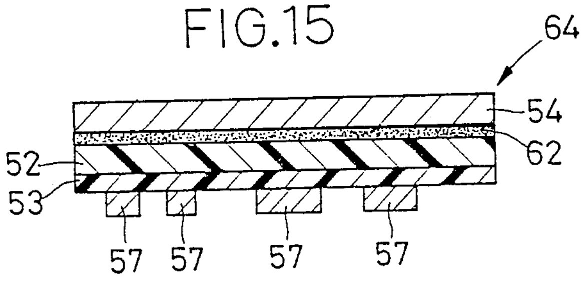
FIG. 15 is a cross sectional view taken along line 15—15 of FIG. 14(*a*), showing a dry transfer sheet prepared from the carrier sheet FIGS. 14(*a*) and 14(*b*)

Referring next to FIGS. 14(*a*), 14(*b*) and 15, there is illustrated a further modified carrier sheet 61. Unlike the carrier sheet 51 of FIGS. 8–10, the carrier sheet 61 does not have the markers 55, and uses an adhesive band 62 in place of the adhesive layer 56. The adhesive band 62, which has a suitable width, is formed along the edge of one of four sides of the support base 52 or opaque layer 54, so that the opaque layer 54 is partially bonded to the base 52. Like the adhesive layer 56, the adhesive band 62 permits easy separation of the opaque layer 54 from the base 52 when a dry transfer sheet 64 (FIG. 15) prepared from the carrier sheet 61 is used. However, the adhesive band 62 may be adapted to securely bond the opaque layer 54 to the base 52, if the opaque layer 54 can be folded or otherwise treated so as not to disturb an image transfer operation by the user.

The instant carrier sheet 61 can also be readily positioned on the thermal printer, by photoelectrically detecting the opaque layer 54 bonded to the base 52 by the adhesive band 62.

When the prepared dry transfer sheet 64 is used, the opaque layer 54 is separated from the base 52 or folded so as to permit applying a pressure to the back of the base 52 after positioning the transfer sheet 64 at a desired location on a receiving surface.

Figure 16:
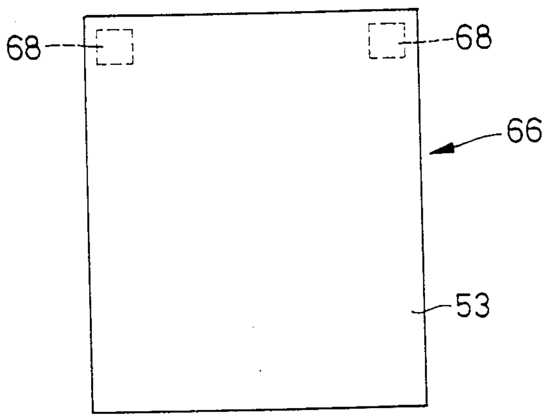
FIG. 16 is a plan view of a carrier sheet used according to a yet further embodiment of the invention.

The adhesive band 62 of FIGS. 14(*a*) and 14(*b*) may be replaced by a pair of adhesive pads 68 as provided on a carrier sheet 66 illustrated in FIG. 16. In this modified arrangement, the adhesive pads 68 are provided at respective two adjacent corners of the support base 52, for partial bonding of the opaque layer 54 to the base 52.

FIGS. 17 and 18 show a further modified carrier sheet 71, wherein the opaque layer 54 are partially bonded to the support base 52 by a pair of parallel adhesive bands 72, 72 which are provided along the edges of two opposite sides of the support base 52.

Referring to FIGS. 19 and 20, a still further modified carrier sheet 73 is shown. This carrier sheet 73 includes an adhesive layer 76 formed on the support base 52, and an opaque layer 74 bonded to the base 52 by the adhesive layer 76. While the adhesive layer 76 is similar to the adhesive layer 56 of the carrier sheet 51 of FIGS. 8 and 9, the opaque layer 74 of the present carrier sheet 73 is different from the opaque layer 54 of the carrier sheet 51. Described more specifically, the opaque layer 74 has a plurality of straight cuts 75 formed parallel to its opposite edges, such that the parallel cuts 75 are equally spaced apart from each other, by a distance equal to a multiple of a standard line-to-line spacing of a printer. Thus, the parallel cuts 75 divide the opaque layer 74 into equal elongate rectangular divisions.

With the desired images 57 transferred to the carrier sheet 73 by the printer, a dry transfer sheet 78 is prepared as shown in FIG. 21. When the images 57 are transferred from the dry transfer sheet 78 to a receiving surface, the rectangular divisions of the opaque layer 74 which correspond to the printed area of the release layer 53 are separated from the carrier sheet 73. If necessary, the printed portion of the dry transfer sheet 78 is cut off, before or after the appropriate divisions of the opaque layer 74 are removed. The printed portion of the transfer sheet 78 is then laid, with the printed side or release layer 53 in contact with the receiving surface. The images 57 are transferred to the receiving surface by applying a pressure to the back of the transfer sheet 78.

FIG. 22 and 23 show a yet further modified carrier sheet 81 which is characterized by a three-layer adhesive sheet 90 formed on one side of the support base 52 opposite to the release layer 53. The adhesive layer 90 consists of an inner release layer 85, an intermediate adhesive layer 86, and an outer opaque layer 87 which are superposed on each other. The release layer 85 has a smaller size than the adhesive and opaque layers 86, 87, and is positioned such that one of its side edges is inwardly spaced by a suitable distance from the corresponding edges of the adhesive and opaque layers 86, 87. In this arrangement, a portion of the adhesive layer 86 directly contacts the corresponding portion of the base 52, so that the corresponding portion of the opaque layer 87 is bonded directly to the base 52 by the adhesive layer 86, without the release layer 85 interposed therebetween. Like the opaque layer 74 of the carrier sheet 73 of FIGS. 19, 20, the release layer 85 of the adhesive sheet 90 has a plurality of parallel straight cuts 88, which divide the release layer 85 into equal divisions.

In the instant carrier sheet 81 having the adhesive sheet 90, the opaque layer 87 may be easily separated from the support base 52 when a dry transfer sheet 91 (FIG. 24) prepared from the carrier sheet 81 is used. Further, the equal divisions of the release layer 85 may be easily removed in the presence of the parallel cuts 88. More particularly, when the dry transfer sheet 91 is used to transfer the printed images 57 to a receiving surface, the portion of the transfer sheet 91 which bears the images 57 to be transferred is cut off. Then, the corresponding portion of the opaque layer 87 of the adhesive sheet 90 is removed from the removed portion of the support base 52 by means of the corresponding portion of the release layer 85. When the remaining portion of the dry transfer sheet 91 (carrier sheet 81) is subsequently used to receive desired images by thermal printing, one or two divisions of the release layer 85 is/are removed to expose the end portion of the adhesive layer 86 and thereby bond the opaque layer 87 to the end portion of the support base 52. Thus, the opaque layer 87 is prevented from being easily displaced relative to the support base 52, during a thermal printing operation on the remaining portion of the carrier sheet 81. In this manner, the carrier sheet 81 employing the adhesive sheet 90 tentatively bonded to the base 52 can be used several times, as long as its size is sufficient to receive a desired amount of new images.

To further illustrate the principle of the present invention, presently preferred examples embodying the invention will be described. However, it is to be understood that the following examples are provided merely to aid in the understanding of the invention, and various variations, modifications and improvements may be made by one skilled in the art, without departing from the spirit and scope of the invention.

EXAMPLE 1

Initially, a heat-sensitive ink ribbon used for a thermal printer to prepare a dry transfer sheet according to the invention was prepared. For an ink layer and a top coat formed thereon, the following ink composition and top coat composition were prepared in the form of solutions. The ink layer formed from the ink composition had a viscosity of 270 centipoise (cps) at 95° C., and the top coat formed from the top coat composition had a viscosity of 50000–70000 centipoise (cps) at 95° C.

| Ink Composition | Parts by weight |
|---|---|
| Copolymer of α-olefin and maleic anhydride (Diacarna 30 from Mitsubishi Kasei Kogyo K. K., Japan) | 2 |
| Candellila wax (Candellila wax 2698 from Chukyo Yushi K. K., Japan) | 3 |
| Microcrystalline wax (Hi-MiC 1045 from Nippon Seirou Kabushiki Kaisha) | 9 |
| Rosin ester (Super Ester A-100 from Arakawa Kagaku Kogyo K. K., Japan) | 2 |
| Copolymer of ethylene and vinyl acetate (EVA 210 from Mitsui Dupont Chemical K. K., Japan) | 2 |
| Carbon Black (MA-7 from Mitsubishi Kasei Kogyo K. K., Japan) | 2 |
| Methyl isobutyl ketone (solvent) | 100 |

| Top Coat Composition | Parts by weight |
|---|---|
| Copolymer of ethylene and vinyl acetate (EVA 210 from Mitsui Dupont Chemical K. K., Japan) | 1 |
| Petroleum resin (Hi-Resin #90 from Toho Sekiyu Jushi K. K., Japan) | 5 |
| Methyl isobutyl ketone (solvent) | 54 |

As a substrate of the ink ribbon, a 3.5 micron-thick film of polyethylene terephthalate (PET) was used. To this substrate, the above ink composition was applied so as to obtain the dried ink layer having a thickness of 6–7 microns. Then, the above top coat composition was applied to the dried ink layer, so that the dried top coat obtained had a thickness of 1–2 microns. Thus, the heat-sensitive ink ribbon 15 of FIG. 3 was prepared.

The prepared ink ribbon 15 was set on a thermal printer which has the thermal print head 13 of FIGS. 1–3. The distance l between the heat-generating unit or array 14 and the end face of the print head 13 was 200 microns. The carrier sheet 10 of FIG. 1 having the 100-micron thick polyethylene support base 11 and the silicon resin release layer 12 was also set on the printer. The release layer 12 showed a contact angle of 108°–110° relative to a water mass laid thereon. The printer was adjusted to establish the following printing conditions:

Print head angle (α) to carrier sheet 10 . . . 2°
Print head force (X) against carrier sheet 10 . . . 300 g
Ribbon take-up torque (Y) . . . 30 gf·cm A thermal printing operation was performed to print images on the release layer 12 of the carrier sheet 10. The printed images had an excellent quality. The printed carrier sheet 10 was laid with the release layer 12 down, against a receiving surface of a paper sheet, and a finger pressure was applied to the back of the carrier sheet 10. As a result, the images were transferred from the carrier sheet to the paper sheet. The transferred images had a sufficiently satisfactory quality. Similar results were obtained on receiving surfaces of a plastic film and a metal sheet.

A printing operation was conducted under the same conditions as described above, except for changing the distance l from 200 microns to 1 mm. However, substantially no ink material was transferred from the ink ribbon 15 to the carrier sheet 10.

EXAMPLE 2

The ink ribbon 15 was prepared in the same manner as described with respect to Example 1, but by using the following ink and top coat compositions:

| Ink Composition | Parts by weight |
|---|---|
| Copolymer of α-olefin and maleic anhydride (Diacarna 30 from Mitsubishi Kasei Kogyo K. K., Japan) | 8 |
| Candellila wax (Candellila wax 2698 from Chukyo Yushi K. K., Japan) | 5 |
| Rosin ester (Super Ester A-100 from Arakawa Kagaku Kogyo K. K., Japan) | 2 |
| Copolymer of ethylene and vinyl acetate (EVA 210 from Mitsui Dupont Chemical K. K., Japan) | 3 |
| Carbon Black (MA-7 from Mitsubishi Kasei Kogyo K. K., Japan) | 2 |
| Methyl isobutyl ketone (solvent) | 100 |

| Top Coat Composition | Parts by weight |
|---|---|
| Ethyl cellulose (from Kanto Kagaku K. K., Japan, 10 cps) | 1 |
| Hydrogenated rosin (Hi-Pale from Arakawa Kagaku Kogyo K. K., Japan) | 5 |
| Isopropyl alcohol (solvent) | 54 |

The ink layer and the top coat of the prepared ink ribbon 15 had viscosities of 700 cps and 50000–70000 cps, respectively, at 95° C. A thermal printing was effected, with the print head angle α of 8°, and the ribbon take-up torque of 70 gf·cm. The other conditions were identical with those of Example 1. The operation demonstrated satisfactory images printed on the carrier sheet 10. Further, the printed images were suitably transferred to a paper sheet.

COMPARATIVE EXAMPLE 1

A thermal printing operation was performed under the following conditions:

Print head angle (α) to carrier sheet 10 . . . 2°
Print head force (X) against carrier sheet 10 . . . 500 g
Ribbon take-up torque (Y) . . . 20 gf·cm The ink ribbon 15 was pulled in the printing direction by the print head 13, and was not correctly taken up. As a result, the printing actions took place at the same portions of the ink ribbon 15, and the desired images were not printed as commanded, due to complete or partial failure of transfer of the ink material from the heated portions of the ribbon. Thus, the prepared dry transfer sheet was not satisfactory.

EXAMPLE 3

To produce the carrier sheet 10, the following solution was prepared for the release layer 12 to be formed on the 100-micron thick support base 11 made of PET (polyethylene terephthalate):

| Composition for Release Layer 12 | Parts by weight |
|---|---|
| Silicone resin (KS-841 from Shinetsu Kagaku Kogyo K. K., Japan) | 10 |
| Hardener (PL-7 from Shinetsu Kagaku Kogyo K. K., Japan) | 0.3 |

-continued

| Composition for Release Layer 12 | Parts by weight |
|---|---|
| Toluene | 90 |

The release layer 12 of the produced carrier sheet 10 had a smooth surface having a contact angle of 108°-110° to a water mass laid thereon.

A thermal printing was performed on the carrier sheet 10, by using a typewriter (EP-43 available from Brother Kogyo) which has a thermal print head. The printed images on a thus prepared dry transfer sheet were transferred under a finger pressure to receiving surfaces of paper, plastic and metal sheets. The transferred images had an acceptable quality.

A carrier sheet consisting solely of a PET film was prepared. The PET film had a contact angle of 70°-75° to a water mass laid thereon. A thermal printing operation was conducted on this PET film carrier sheet, under the same conditions indicated just above, to produce a dry transfer sheet. However, the images printed on this dry transfer sheet were not correctly pressure-transferred to the receiving surfaces.

EXAMPLE 4

The following composition was used to form the release layer 12 on the 100-micron thick support base 11 which consists of a nylon 66 film. The formed release layer 12 had a smooth surface having a contact angle of 108°-110° to a water drop mass.

| Composition for Release Layer 12 | Parts by weight |
|---|---|
| Silicone resin (KS-774 from Shinetsu Kagaku Kogyo K. K., Japan) | 10 |
| Hardener (PL-4 from Shinetsu Kagaku Kogyo K. K., Japan) | 0.3 |
| Toluene | 90 |

A dry transfer sheet was prepared by using the thus prepared carrier sheet. The printed images were satisfactorily transferred from the thus prepared dry transfer sheet to receiving surfaces. For comparison, a dry transfer sheet was prepared by using a carrier sheet which consists solely of the nylon 66 film (having a contact angle of 65°-70° to a water drop mass). This dry transfer sheet did not permit a satisfactory image transfer to the receiving surfaces.

EXAMPLE 5

A dry transfer sheet was prepared in the same manner as in Example 3, but by using a 100-micron thick high-density polyethylene film for the support base 11. This dry transfer sheet showed an excellent image transfer as in Example 3.

EXAMPLE 6

A dry transfer sheet was prepared by using a carrier sheet which consists solely of a 100-micron thick high-density polyethylene film having a water contact angle of 95°-100°, and by using the thermal printer EP-43 (Brother Industries Ltd.) to effect a thermal printing on the carrier sheet. The printed images were pressure-transferred from the prepared transfer sheet to receiving surfaces of paper and plastic sheets. The transferred images had a satisfactory quality.

EXAMPLE 7

A dry transfer sheet was prepared by thermal printing as in Example 6, in a carrier sheet which consists solely of a 100-micron thick polypropylene film which has a water contact angle of 95°-100°. This dry transfer sheet also showed an acceptable image transfer to a receiving surface.

EXAMPLE 8

A thermal printing was conducted in the same manner as in Example 6, on a carrier sheet which consists solely of a 200-micron thick film made of a copolymer of ethylene and tetrafluoroethylene having a water contact angle of 112°. The obtained dry transfer sheet also showed a satisfactory result as in Example 6.

EXAMPLE 9

A thermal printing was conducted under the same condition as in Example 1, on the carrier sheet 10 used in Example 1, by using an ink ribbon whose ink layer was made of the same ink composition as used in Example 1, and whose top coat was made of the following composition:

| Top Coat Composition | Parts by weight |
|---|---|
| Polyamide (Sanmide 615A from Sanwa Kagaku Kogyo K. K., Japan) | 1 |
| Ketone resin (Ketone Resin K-90 from Arakawa Kagaku Kogyo K. K., Japan) | 1 |
| Toluene (solvent) | 38 |

COMPARATIVE EXAMPLES 2-4

Thermal printing operations were conducted under the same conditions as in Example 1, by using three different ink ribbons. The ink ribbon used in Comparative Example 2 has an ink layer made of the ink composition of Example 1, but does not have a top coat. The ink ribbon used in Comparative Example 3 has an ink layer made of the ink composition of Example 2, but does not have a top coat. The ink ribbon used in Comparative Example 4 is a wax-type heat-sensitive ink ribbon available from Fuji Kagakushi Kogyo. The thermal printing operations were not satisfactory, due to insufficient adhesive strength, cohesive strength, viscosity and hardness of the ink material, which caused various troubles or defects: poor ink transfer to the carrier sheet; expansion or collapse of the printed images; scratching of the printed images by the print head; variation in the image density; and pin holes in the printed images. Further, the transfer from the prepared dry transfer sheets to receiving surfaces was not effected in a satisfactory manner, for the same reasons indicated above. Due to the poor transfer of the ink material from the transfer sheets, the ink material or printed images are more or less left on the transfer sheets, and the transferred images on the receiving surfaces had an unacceptable quality.

EXAMPLE 10

A dry transfer sheet was prepared in the same manner as in Example 9, except that the top coat of the ink ribbon was formed from the following composition:

| Top Coat Composition | Parts by weight |
|---|---|
| Polyamide (Sanmide 615A from Sanwa Kagaku Kogyo K. K., Japan) | 1 |
| Hydrogenated rosin (Hi-Pale from Arakawa Kagaku Kogyo K. K., Japan) | 1 |
| Isopropyl alcohol | 38 |

The prepared transfer sheet showed an acceptable result.

EXAMPLE 11

A dry transfer sheet was prepared in the same manner as in Example 9, except that the top coat of the ink ribbon was formed from the following composition:

| Top Coat Composition | Parts by weight |
|---|---|
| Polyamide (Sanmide 615A from Sanwa Kagaku Kogyo K. K., Japan) | 91 |
| Hydrogenated rosin (Hi-Pale from Arakawa Kagaku Kogyo K. K., Japan) | 91 |
| Titanium oxide (A-100 from Ishihara Sangyo K. K., Japan) | 18 |
| Isopropyl alcohol | 3800 |

The top coat of the ink ribbon had a viscosity of 30000–50000 cps at 95° C. The prepared transfer sheet showed an acceptable result.

EXAMPLE 12

A dry transfer sheet was prepared in the same manner as in Example 9, except that the top coat of the ink ribbon was formed from the following composition:

| Top Coat Composition | Parts by weight |
|---|---|
| Polyamide (Sanmide 615A from Sanwa Kagaku Kogyo K. K., Japan) | 1 |
| Rosin ester (Super Ester A-100 from Arakawa Kagaku Kogyo K. K., Japan) | 1 |
| Isopropyl alcohol | 38 |

The top coat of the ink ribbon had a viscosity of 40000–60000 cps at 95° C. The prepared transfer sheet showed an acceptable result.

The same ink ribbon in the form of a roll was tested under the following different conditions, to check its storage durability:

Specimen 1:

The ribbon was maintained at 35° C. for 72 hours.

Specimen 2:

The ribbon was maintained at 55° C. for 24 hours.

Specimen 3:

The ribbon was maintained at 35° C. for 72 hours, and then at 55° C. for 24 hours.

Specimen 4:

The ribbon was maintained at 55° C. for 24 hours, and then at 35° C. for 72 hours.

All of the specimens 1–4 showed excellent storage durability, without their top coat sticking to the back of the substrate, and without disordering of wound turns of the rolls.

The specimens 1–4 which have been subjected to the storage durability test, and other specimens which are not subjected to the test, were set on a thermal printer, to check their feeding performance. All the specimens were fed in a smooth manner, without a meandering motion due to a slack, or a feeding failure due to a slip of the take-up spool.

EXAMPLE 13

A dry transfer sheet was prepared in the same manner as in Example 9, except that the top coat of the ink ribbon was formed from the following composition:

| Top Coat Composition | Parts by weight |
|---|---|
| Polyamide (Sanmide 615A from Sanwa Kagaku Kogyo K. K., Japan) | 91 |
| Rosin ester (Super Ester A-100 from Arakawa Kagaku Kogyo K. K., Japan) | 91 |
| Titanium oxide (A-100 from Ishihara Sangyo K. K., Japan) | 18 |
| Isopropyl alcohol (solvent) | 3800 |

The top coat of the ink ribbon had a viscosity of 50000–70000 cps at 95° C. The prepared transfer sheet showed satisfactory results in terms of thermal printing quality, and image transfer to receiving surfaces. Further, the ink ribbon demonstrated acceptable results in terms of storage durability and feeding performance, as in Example 12.

EXAMPLE 14

A dry transfer sheet was prepared in the same manner as in Example 9, except that the top coat of the ink ribbon was formed from the following composition:

| Top Coat Composition | Parts by weight |
|---|---|
| Copolymer of ethylene and vinyl acetate (EVA 210 from Mitsui Dupont Chemical K. K., Japan) | 1 |
| Petroleum resin (Hi Resin #90 from Toho Sekiyu Jushi K. K., Japan) | 5 |
| Lubricant: stearic acid amide (Amide S from Kao K. K., Japan) | 0.3 |
| Methyl isobutyl ketone (solvent) | 54 |

The top coat of the ink ribbon had a viscosity of 50000–70000 cps at 95° C. The prepared transfer sheet showed satisfactory results in terms of thermal printing quality, and image transfer to receiving surfaces. The same ink ribbon in the form of a roll was tested under the different conditions specified above with respect to Example 12, to check the storage durability of each specimen. All of the specimens showed excellent storage durability. Further, the same ink ribbon was tested for feeding performance, and the test revealed a satisfactory result.

EXAMPLE 15

An ink ribbon used was prepared by using the following ink and top coat compositions. The ink layer formed from the ink composition had a viscosity of 700 centipoise (cps) at 95° C., and the top coat formed from the top coat composition had a viscosity of 50000–70000 cps at 95° C.

| Ink Composition | Parts by weight |
|---|---|
| Copolymer of α-olefin and maleic anhydride (Diacarna 30 from Mitsubishi Kasei Kogyo K. K., Japan) | 8 |
| Candellila wax (Candellila wax 2698 from Chukyo Yushi K. K., Japan) | 5 |
| Rosin ester (Super Ester A-100 from Arakawa | 2 |

-continued

| Ink Composition | Parts by weight |
|---|---|
| Kagaku Kogyo K. K., Japan) | |
| Copolymer of ethylene and vinyl acetate (EVA 210 from Mitsui Dupont Chemical K. K., Japan) | 3 |
| Carbon Black (MA-7 from Mitsubishi Kasei Kogyo K. K., Japan) | 2 |
| Methyl isobutyl ketone (solvent) | 100 |

| Top Coat Composition | Parts by weight |
|---|---|
| Ethyl cellulose (from Kanto Kagaku K.K , Japan, 10 cps) | 1 |
| Hydrogenated rosin (Hi-Pale from Arakawa Kagaku Kogyo K. K., Japan) | 5 |
| Lubricant (hardened castor oil; K-3 wax from Kawaken Fine Chemical K. K., Japan) | 0.3 |
| Isopropyl alcohol (solvent) | 54 |

A dry transfer sheet prepared by thermal printing using the thus prepared ink ribbon demonstrated acceptable results in terms of thermal printing quality and image transfer to receiving surfaces.

EXAMPLE 16

A dry transfer sheet was prepared by using an ink ribbon which was prepared from the same ink composition as used in Example 14, and a top coat composition indicated below:

| Top Coat Composition | Parts by weight |
|---|---|
| Polyamide (Sanmide 615A from Sanwa Kagaku Kogyo K. K., Japan)) | 1 |
| Ketone resin (Ketone Resin K090 from Arakawa Kagaku Kogyo K. K., Japan) | 1 |
| Stearyl alcohol (Alcohol 80 from Kao K. K., Japan) | 0.1 |
| Toluene (solvent) | 38 |

The top coat of the prepared ink ribbon had a viscosity of 50000–70000 cps. The dry transfer sheet produced by using this ink ribbon also showed excellent results.

COMPARATIVE EXAMPLES 5-7

Thermal printing operations were conducted under the same conditions as in Example 14, by using three different ink ribbons. The ink ribbon used in Comparative Example 5 has an ink layer made of the ink composition of Example 14, but does not have a top coat. The ink ribbon used in Comparative Example 6 has an ink layer made of the ink composition of Example 15, but does not have a top coat. The ink ribbon used in Comparative Example 7 is a wax-type heat-sensitive ink ribbon available from Fuji Kagakushi Kogyo. The thermal printing operations were not satisfactory, due to insufficient adhesive strength, cohesive strength, viscosity and hardness of the ink material, which caused various troubles or defects as described with respect to Comparative Examples 2–4. Due to the poor transfer of the ink material from the transfer sheets, the ink material or printed images are more or less left on the transfer sheets, and the images transferred to receiving surfaces had an unacceptable quality.

COMPARATIVE EXAMPLES 8 AND 9

Ink ribbons were prepared from the same ink and top coat compositions as used in Examples 15 and 16, except that the top coat compositions did not contain the lubricants. The prepared ribbons were subjected to feeding performance and storage durability tests as conducted in Example 14. The test showed partial sticking of the top coat to the back of the substrate, and excessively high tackiness or adhesive strength, which caused a slipping action of the take-up spool for the ribbon, and consequent improper feeding of the ribbon which resulted in printing failure.

EXAMPLE 17

An ink ribbon was prepared by using the following ink and top coat compositions:

| Ink Composition | Parts by weight |
|---|---|
| Copolymer of α-olefin and maleic anhydride (Diacarna 30 from Mitsubishi Kasei Kogyo K. K., Japan; max. penetration value at 55° C. = 10) | 2 |
| Candellila wax (Candellila wax 2698 from Chukyo Yushi K. K., Japan; penetration at 55° C. = about 10) | 3 |
| Paraffin wax (HNP-10 from Nippon Seirou Kabushiki Kaisha; penetration at 55° C. = about 20) | |
| Rosin ester (Super Ester A-100 from Arakawa Kagaku Kogyo K. K., Japan) | |
| Copolymer of ethylene and vinyl acetate (EVA 210 from Mitsui Dupont Chemical K. K., Japan) | 2 |
| Carbon Black (MA-7 from Mitsubishi Kasei Kogyo K. K., Japan) | 2 |
| Methyl isobutyl ketone (solvent) | 100 |

| Top Coat Composition | Parts by weight |
|---|---|
| Copolymer of ethylene and vinyl acetate (EVA 210 from Mitsui Dupont Chemical K. K., Japan) | 1 |
| Petroleum resin (Hi-Resin #90 from Toho Sekiyu Jushi K. K., Japan) | 5 |
| Methyl isobutyl ketone (solvent) | 54 |

The ink layer and the top coat of the thus prepared ink ribbon had viscosities of 250 cps and 50000–70000 cps, respectively, at 95° C. 100% by weight of the wax components which are major components of the binder in the ink composition had a penetration value of not exceeding 50 at 55° C.

By using the prepared ink ribbon, a dry transfer sheet was prepared by thermal printing as in Example 1. The obtained dry transfer sheet had fine printed images, and the images transferred from this transfer sheet to a receiving surface showed an acceptable quality. Further, a similarly prepared ink ribbon was subjected to a feeding test, and a storage durability test at 55° C. for 24 hours. The ribbon was fed smoothly, and experienced no abnormalities at the elevated storage temperature, such as disordering of winding of the ribbon roll.

EXAMPLE 18

An ink ribbon was prepared by using the following ink and top coat compositions:

| Ink Composition | Parts by weight |
|---|---|
| Paraffin wax (HNP-14 from Nippon Seirou K. K., Japan; penetration at 55° C. = about 20-25) | 4 |
| Copolymer of α-olefin and maleic anhydride | 5 |

-continued

| Ink Composition | Parts by weight |
|---|---|
| (Diacarna 30 from Mitsubishi Kasei Kogyo K. K., Japan; max. penetration value at 55° C. = 10) | |
| Candellila wax (Candellila wax 2698 from Chukyo Yushi K. K., Japan; penetration at 55° C. = about 10) | 3 |
| Microcrystalline wax (Hi-MiC 1045 from Nippon Seirou K. K., Japan; penetration at 55° C. = about 150) | 1 |
| Rosin ester (Super Ester A-100 from Arakawa Kagaku Kogyo K. K., Japan) | 2 |
| Copolymer of ethylene and vinyl acetate (EVA 210 from Mitsui Dupont Chemical K. K., Japan) | 3 |
| Carbon Black (MA-7 from Mitsubishi Kasei Kogyo K. K., Japan) | 2 |
| Methyl isobutyl ketone (solvent) | 100 |

| Top Coat Composition | Parts by weight |
|---|---|
| Ethyl cellulose (from Kanto Kagaku K. K., Japan, 10 cps) | 1 |
| Hydrogenated rosin (Hi-Pale from Arakawa Kagaku Kogyo K. K., Japan) | 5 |
| Oleic amide (Amide O from Kao K. K., Japan) | 0.18 |
| Isopropyl alcohol (solvent) | 54 |

The ink layer and the top coat of the thus prepared ink ribbon had viscosities of 500 cps and 50000–70000 cps, respectively, at 95° C. About 92% by weight of the wax components which are major components of the binder in the ink composition had a penetration value of not exceeding 50 at 55° C.

A thermal printing was effected on the prepared ink ribbon, as in Example 1, to prepare a dry transfer sheet. The obtained dry transfer sheet had fine printed images, and the images transferred from this transfer sheet to a receiving surface showed an acceptable quality. Further, a similarly prepared ink ribbon was subjected to a feeding test, and a storage durability test at 55° C. for 24 hours. The tests showed smooth feeding of the ribbon, and no abnormalities at the elevated storage temperature.

EXAMPLE 19

An ink ribbon was prepared from the same ink composition used in Example 17, and the top coat composition indicated below:

| Top Coat Composition | Parts by weight |
|---|---|
| Polyamide (Sanmide 615A from Sanwa Kagaku Kogyo K. K., Japan) | 1 |
| Ketone resin (Ketone Resin K-90 from Arakawa Kagaku Kogyo K. K., Japan) | 1 |
| High-molecular surface modifier (Modiper F-100 from Nippon Yushi K. K., Japan) | 0.06 |
| Toluene (solvent) | 38 |

The top coat of the thus prepared ink ribbon had a viscosity of 50000–70000 cps at 95° C. By using the prepared ink ribbon, a dry transfer sheet was prepared by thermal printing as in Example 1. The obtained dry transfer sheet had good printed images, and demonstrated satisfactory image transfer results. Further, a similarly prepared ink ribbon was subjected to a feeding test, and storage durability test. The tests showed acceptable results.

COMPARATIVE EXAMPLES 10–12

Thermal printing operations were conducted under the same conditions as in Example 1, by using three different ink ribbons. The ink ribbon used in Comparative Example 10 has an ink layer made of the ink composition of Example 17, but does not have a top coat. The ink ribbon used in Comparative Example 11 has an ink layer made of the ink composition of Example 18, but does not have a top coat. The ink ribbon used in Comparative Example 12 is a wax-type heat-sensitive ink ribbon available from Fuji Kagakushi Kogyo. The thermal printing tests and subsequent image transfer tests showed unacceptable results due to insufficient adhesive strength, cohesive strength, viscosity and hardness of the ink material.

COMPARATIVE EXAMPLE 13

An ink ribbon was prepared by replacing the paraffin wax used in Example 17 by bees wax (available from Kato Yoko; penetration at 40° C.=45–50, penetration at 55° C.=higher than 50). A storage durability test of a roll of the prepared ink ribbon at 55° C. for 24 hours revealed sticking of the top coat to the back of the substrate, and disordered winding of the roll.

EXAMPLE 20

An ink ribbon was prepared from the same ink composition used in Example 1, and the top coat composition indicated below:

| Top Coat Composition | Parts by weight |
|---|---|
| Copolymer of ethylene and vinyl acetate (EVA 210 from Mitsui Dupont Chemical K. K., Japan) | 1 |
| Petroleum resin (High Resin #90 from Toho Sekiyu Jushi K. K., Japan) | 5 |
| High-molecular surface modifier (Modiper F-100 from Nippon Yushi K. K., Japan) | 0.18 |
| Methyl isobutyl ketone (solvent) | 54 |

The ink layer formed from the ink composition a viscosity of 270 cps at 95° C., and the top coat formed from the top coat composition had a viscosity of 50000–70000 cps at 95° C. By using the prepared ink ribbon, a dry transfer sheet was prepared by thermal printing as in Example 1. The obtained dry transfer sheet had good printed images, and demonstrated satisfactory image transfer results. Further, a similarly prepared ink ribbon was subjected to feeding and storage durability tests under the same conditions as in Example 12. The tests demonstrated satisfactory results.

EXAMPLE 21

An ink ribbon was prepared by using the following ink and top coat compositions:

| Ink Composition | Parts by weight |
|---|---|
| Copolymer of α-olefin and maleic anhydride (Diacarna 30 from Mitsubishi Kasei Kogyo K. K., Japan) | 8 |
| Candellila wax (Candellila wax 2698 from Chukyo Yushi K. K., Japan) | 5 |
| Rosin ester (Super Ester A-100 from Arakawa Kagaku Kogyo K. K., Japan) | 2 |
| Copolymer of ethylene and vinyl acetate (EVA 210 from Mitsui Dupont Chemical K. K., Japan) | 3 |
| Carbon Black (MA-7 from Mitsubishi Kasei | 2 |

-continued

| Ink Composition | Parts by weight |
|---|---|
| Kogyo K. K., Japan) | |
| Methyl isobutyl ketone (solvent) | 100 |

| Top Coat Composition | Parts by weight |
|---|---|
| Ethyl cellulose (from Kanto Kagaku K. K., Japan, 10 cps) | 1 |
| Hydrogenated rosin (Hi-Pale from Arakawa Kagaku Kogyo K. K., Japan) | 5 |
| High-moleculae surface modifier (Modiper F-100 from Nippon Yushi K. K., Japan) | |
| Isopropyl alcohol (solvent) | 54 |

The ink layer and the top coat of the thus prepared ink ribbon had viscosities of 700 cps and 50000–70000 cps, respectively, at 95° C.

A thermal printing was effected on the prepared ink ribbon, as in Example 1, to prepare a dry transfer sheet. The obtained dry transfer sheet had fine printed images, and the images transferred from this transfer sheet to a receiving surface showed an acceptable quality. Further, feeding and storage durability tests of a similarly prepared ink ribbon showed smooth feeding of the ribbon, and no abnormalities at the elevated storage temperature.

EXAMPLE 22

An ink ribbon was prepared by using the same ink composition as used in Example 1 (Example 20), and the same top coat composition as used in Example 19. Thermal printing and image transfer tests, and feeding and storage durability tests, demonstrated acceptable results.

COMPARATIVE EXAMPLES 14–17

Thermal printing operations were conducted under the same conditions as in Example 1, by using three different ink ribbons. The ink ribbon used in Comparative Example 14 has an ink layer made of the ink composition of Example 1 (Example 20), but does not have a top coat. The ink ribbon used in Comparative Example 15 has an ink layer made of the ink composition of Example 21, but does not have a top coat. The ink ribbon used in Comparative Example 16 is a wax-type heat-sensitive ink ribbon available from Fuji Kagakushi Kogyo. The thermal printing tests and subsequent image transfer tests showed unacceptable results due to insufficient adhesive strength, cohesive strength, viscosity and hardness of the ink material.

COMPARATIVE EXAMPLES 17 AND 18

Ink ribbons were prepared by using the ink and top coat compositions used in Examples 21 and 22, respectively, but by eliminating the high-molecular surface modifier. Feeding and storage durability tests revealed sticking troubles of the ribbon due to excessive tackiness of the ribbon surface, which caused feeding failure due to a slipping action of the take-up spool for the ribbon.

What is claimed is:

1. A method of preparing a dry transfer sheet bearing indicia such as characters and designs, and transferring said indicia from said dry transfer sheet to a receiving surface of a receiving member, comprising the steps of:

preparing a heat-sensitive ink ribbon which has an ink layer comprising a thermally fusible ink composition;

preparing a thermal printer having a print head for heating selected portions of said ink layers;

preparing a carrier sheet having an image-receiving surface;

setting said heat-sensitive ink ribbon and said carrier sheet on said thermal printer, such that said ink ribbon is interposed between said print head and said carrier sheet;

entering printing data representative of desired indicia into said printer;

activating said print head according to the entered printing data, in order to heat local portions of said ink layer which correspond to said desired indicia, and thereby transfer said ink composition from the heated local portions to said image-receiving surface of said carrier sheet, whereby said desired indicia are printed on said image-receiving surface with the transferred ink composition; and transferring said transferred ink composition forming said desired indicia from said image-receiving surface of said carrier sheet to said receiving surface of said receiving member.

2. A method according to claim 1, wherein said step of preparing a thermal printer comprises arranging a heat-generating array of said print head such that a centerline of said heat-generating array is spaced by a distance of 50–500 microns away from a trailing end of the print head as viewed in a direction of printing, said method further comprising a step of establishing printing conditions so as to satisfy the following formulas:

$$Y > 1.4 \times 10^{-4} X^2 + Z$$

$$Z = (10\alpha + 25)/3$$

where,

X = force (g) by which said print head is pressed against said carrier sheet via said ink ribbon Y = torque (gf·cm) of a take-up spool by which said ink ribbon is pulled α = angle (degree) of said print head relative to said image-receiving surface of said carrier sheet.

3. A method according to claim 1, wherein said step of preparing a carrier sheet comprises preparing said carrier sheet to have a thickness of 50–200 microns, and said image-receiving surface of said carrier sheet to have a surface characteristic represented by a contact angle of at least 95° with respect to a mass of water laid thereon.

4. A method according to claim 3, wherein said step of preparing a carrier sheet comprises preparing said carrier sheet to include a support base formed from a material selected from the group consisting of a paper, a metallic foil and a plastic film, and a release layer formed on said support base, said release layer comprising a silicone resin, said release layer providing said image-receiving surface which has said contact angle.

5. A method according to claim 1, wherein said step of preparing a carrier sheet comprises preparing said image-receiving surface of said carrier sheet from a material selected from the group consisting of polyethylene, polypropylene and fluorine-contained resin, whereby said image-receiving surface is given said contact angle.

6. A method according to claim 1, wherein said step of preparing a heat-sensitive ink ribbon comprises preparing said heat-sensitive ink ribbon to further have a substrate in the form of a film on which said ink layer is formed, and a top coat formed on said ink layer, said ink composition comprising a coloring agent, a binder and a pressure-sensitive adhesive, said top coat comprising a top coat composition which includes a first resin material that is a heat-sensitive adhesive, and a second resin material for increasing tackiness of said ink layer, said top coat having higher values of adhesive strength under heat, hardness and cohesive strength, than said ink layer.

7. A method according to claim 6, wherein said step of preparing a heat-sensitive ink ribbon comprises preparing said ink composition to have a viscosity of not exceeding 3000 cps at 95° C., and said top coat composition to have a viscosity of at least 3000 cps at 95° C.

8. A method according to claim 5, wherein said step of preparing a heat-sensitive ink ribbon comprises preparing said top coat composition to comprise polyamide as said first resin material, and hydrogenated rosin as said second resin material.

9. A method according to claim 5, wherein said step of preparing a heat-sensitive ink ribbon comprises preparing said top coat composition to further comprise an inorganic or organic powder in an amount of not exceeding 20% by weight.

10. A method according to claim 9, wherein said step of preparing a heat-sensitive ink ribbon comprises preparing said inorganic or organic powder to include a metallic soap.

11. A method according to claim 6, wherein said step of preparing a heat-sensitive ink ribbon comprises preparing said top coat composition to comprise polyamide as said first resin material, and rosin ester as said second resin material.

12. A method according to claim 6, wherein said step of preparing a heat-sensitive ink ribbon comprises preparing said top coat composition to further comprise a lubricant.

13. A method according to claim 12, wherein said step of preparing a heat-sensitive ink ribbon comprises preparing said lubricant form a material selected from the group consisting of: higher fatty alcohol such as stearyl alcohol; glycerin ester such as stearic acid monoglyceryl ester; sorbitan ester such as sorbitan monostearate, sorbitan monopalmitate; higher fatty acid such as stearic acid; oily wax such as hardened castor oil; monoamide such as stearic acid amide; bisamide such as ethylene bisstearic acid amide; hydroxy-fatty acid such as 12-hydroxystearic acid; and ester such as butyl stearate.

14. A method according to claim 6, wherein said step of preparing a heat-sensitive ink ribbon comprises preparing said binder of said ink composition to contain as a major component at least one wax, at least 80% by weight of said at least one wax having a penetration value of not exceeding 50 at 55° C.

15. A method according to claim 6, wherein said step of preparing a heat-sensitive ink ribbon comprises preparing said top coat composition to further comprises a high-molecular surface modifier.

16. A method according to claim 15, wherein said step of preparing a heat-sensitive ink ribbon comprises preparing said high-molecular surface modifier to comprise a fluorine-contained resin or a silicone polymer.

17. A method according to claim 1, wherein said step of preparing a carrier sheet comprises preparing said carrier sheet to include a transparent or translucent support base which has said image-receiving surface, and an opaque layer provided on one of opposite sides of said support base remote from said image-receiving surface.

18. A method according to claim 17, further comprising a step of detecting said carrier sheet on said printer, by detecting a light beam which is reflected by or transmitted through said opaque layer.

19. A method according to claim 17, further comprising a step of separating said opaque layer form said support base of said carrier sheet after said indicia are printed on said image-receiving surface of said carrier sheet.

20. A method according to claim 19, wherein said step of preparing a carrier sheet comprises preparing said opaque layer to comprise a layer which reflects a light beam.

21. A method according to claim 19, wherein said step of preparing a carrier sheet comprises preparing said opaque layer to comprise a layer which partially absorbs a light beam.

22. A method according to claim 17, wherein said step of preparing a carrier sheet comprises preparing at least one of said opaque layer and said support base to have markers, said markers indicating positions at which said indicia are printed.

23. A method according to claim 22, wherein said step of preparing a carrier sheet comprises preparing said markers to comprise a plurality of parallel lines provided on said opaque layer, parallel to opposite edges of said carrier sheet.

24. A method according to claim 17, wherein said step of preparing a carrier sheet comprises preparing said carrier sheet to further include adhesive means interposed between said support base and said opaque layer, for partial bonding between said support base and said opaque layer.

25. A method according to claim 24, wherein said step of preparing a carrier sheet comprises preparing said adhesive means to permit said opaque layer to be separated from said support base.

26. A method according to claim 24, wherein said step of preparing a carrier sheet comprises preparing said adhesive means to comprise an adhesive band provided along one edge of said carrier sheet.

27. A method according to claim 24, wherein said step of preparing a carrier sheet comprises preparing said adhesive means to comprise a pair of adhesive pads provided at adjacent two corners of said carrier sheet.

28. A method according to claim 24, wherein said step of preparing a carrier sheet comprises preparing said adhesive means to include at least one pair of adhesive bands provide along opposite edges of said carrier sheet.

29. A method according to claim 17, wherein said step of preparing a carrier sheet comprises preparing said carrier sheet to further include an adhesive layer interposed between said support base and said opaque layer, for bonding of said opaque layer to said support base over an entire surface area of the opaque layer, and said opaque layer to have a plurality of cuts formed through a thickness thereof, so as to divide said opaque layer into a plurality of divisions.

30. A method according to claim 17, wherein said step of preparing a carrier sheet comprises preparing said carrier sheet to further include a release layer provided on one of opposite surfaces of said support base remote from said image-receiving surface, and an adhesive layer interposed between said release layer and said opaque layer, said release layer having a smaller surface area than said support base, said adhesive layer and said opaque layer, to that a portion of said adhesive layer contacts a corresponding portion of said support base, and thereby directly bonds said opaque layer to said corresponding portion of said support base.

31. A method according to claim 30, wherein said step of preparing a carrier sheet comprises preparing said release layer to have a plurality of cuts formed through a thickness thereof, so as to divide the release layer into divisions.

32. A method of preparing a dry transfer sheet for transfering indicia such as characters and designs to a receiving surface of a receiving member, comprising the steps of:

preparing a heat-sensitive ink ribbon which has an ink layer comprising a thermally fusible ink composition;

preparing a thermal printer having a print head having a heat-generating array for heating selected portions of said ink layer, such that a centerline of said heat-generating array is spaced by a distance of 50–500 microns away from a trailing end of the print head as viewed in a direction of printing;

setting said heat-sensitive ink ribbon and a carrier sheet on said thermal printer, such that said ink ribbon is interposed between said print head and said carrier sheet;

establishing printing conditions so as to satisfy the formula $Y>1.4\times10^{-4}X^2+Z$, where $Z=(10\alpha+25)/3$, X=force (g) by which said print head is pressed against said carrier sheet via said ink ribbon, Y=torque (gf·cm) of a takeup spool by which said ink ribbon is pulled, and $\alpha$=angle (degree) of said print head relative to said image-receiving surface of said carrier sheet;

entering printing data representative of desired indicia into said printer; and activating said print head according to the enter printing data, in order to heat local portions of said ink layer which correspond to said desired indicia, and thereby transfer said ink composition from the heated local portions to said image-receiving surface of said carrier sheet, whereby said desired indicia are printed on said image-receiving surface with the transferred ink composition.

33. A method of preparing a dry transfer sheet according to claim 32, wherein said force X is within a range of 100–500 g.

34. A method of preparing a dry transfer sheet according to claim 32, wherein said angle $\alpha$ is within a range of 0°–8°.

35. A method of preparing a dry transfer sheet for transferring indicia such as a characters and designs to a receiving surface of a receiving member, comprising the steps of:

preparing a heat-sensitive ink ribbon which has an ink layer comprising a thermally fusible ink composition;

preparing a thermal printer having a print head for heating selected portions of said ink layer;

preparing a carrier sheet having an image-receiving surface which has a surface characteristic represented by a contact angle of at least 95° C. with respect to a mass of water laid thereon;

setting said heat-sensitive ink ribbon and said carrier sheet on said thermal printer, such that said ink ribbon is interposed between said print head and said carrier sheet;

entering printing data representative of desired indicia into said printer; and activating said print head according to the entering printing data, in order to heat local portions of said ink layer which correspond to said desired indicia, and thereby transfer said ink composition from the heated local portions to said image-receiving surface of said carrier sheet, whereby said desired indicia are printed on said image-receiving surface with the transferred ink composition.

* * * * *